(12) United States Patent
Chope et al.

(10) Patent No.: US 11,512,423 B1
(45) Date of Patent: Nov. 29, 2022

(54) METHODS AND SYSTEMS FOR 3D FOLDING OF GARMENTS AND OTHER ARTICLES

(71) Applicant: CreateMe Technologies LLC, New York, NY (US)

(72) Inventors: Nicholas Chope, Portland, OR (US); Michael William Tanguay, Camas, WA (US)

(73) Assignee: CreateMe Technologies LLC, New York, NY (US)

( * ) Notice: Subject to any disclaimer, the term of this patent is extended or adjusted under 35 U.S.C. 154(b) by 0 days.

(21) Appl. No.: 17/845,314

(22) Filed: Jun. 21, 2022

(51) Int. Cl.
*B65H 45/04* (2006.01)
*D06F 89/00* (2006.01)
*B29C 65/00* (2006.01)
*A41H 43/02* (2006.01)

(52) U.S. Cl.
CPC ......... *D06F 89/00* (2013.01); *A41H 43/0257* (2013.01); *B29C 66/0222* (2013.01); *B29C 66/1122* (2013.01); *B65H 45/04* (2013.01)

(58) Field of Classification Search
CPC ...... A41H 43/0257; B65H 45/04; D06F 89/00
See application file for complete search history.

(56) References Cited

U.S. PATENT DOCUMENTS

| | | | |
|---|---|---|---|
| 2,616,595 A | 11/1952 | Arruda | |
| 2,921,726 A | 1/1960 | Maxwell et al. | |
| 3,083,618 A | 4/1963 | Vergobbi | |
| 4,522,676 A | 6/1985 | Masao | |
| 4,804,432 A | 2/1989 | Jurrius et al. | |
| 4,865,579 A * | 9/1989 | Kirby | B65H 45/04 493/405 |
| 5,074,444 A | 12/1991 | Cooper | |
| 9,169,595 B2 | 10/2015 | Henry | |
| RE47,186 E | 1/2019 | Selker et al. | |
| 11,135,801 B2 | 10/2021 | Asai | |
| 2011/0130261 A1* | 6/2011 | Parruca | B65H 45/04 493/405 |
| 2017/0015454 A1 | 1/2017 | Sanfilippo et al. | |
| 2018/0326596 A1 | 11/2018 | Prahlad et al. | |
| 2022/0002936 A1 | 1/2022 | Schechter et al. | |
| 2022/0185616 A1* | 6/2022 | Ouchi | A61F 13/15747 |

* cited by examiner

*Primary Examiner* — Scott W Dodds
(74) *Attorney, Agent, or Firm* — Patterson + Sheridan, LLP

(57) ABSTRACT

Fabric items of dissimilar size and/or shape are manipulated and joined. A system includes a folding table for folding a fabric item. The folding table includes a first platen moveable relative to a second platen between a folded position and an unfolded position. The first platen is substantially coplanar with the second platen in the unfolded position. The second platen is disposed above the first platen in the folded position. The system includes a robot that includes a fold plate that is positioned with respect to a first fabric item to facilitate the folding of the first fabric item. The first fabric item is folded twice on the folding table such that first and second edges of the first fabric item can be aligned with corresponding first and second edges of a second fabric item. The first and second fabric items are joined at the respective first and second edges.

7 Claims, 20 Drawing Sheets

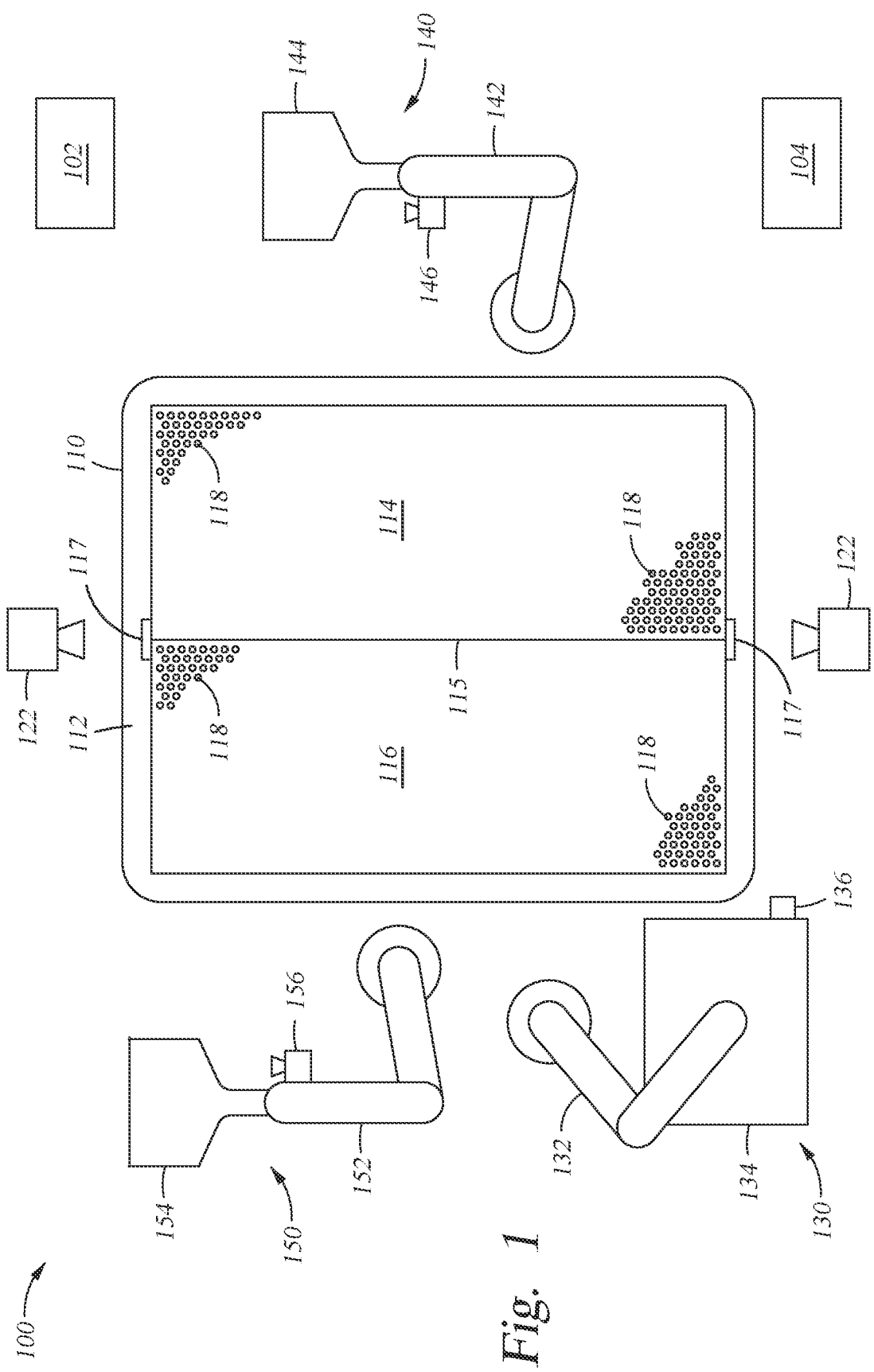

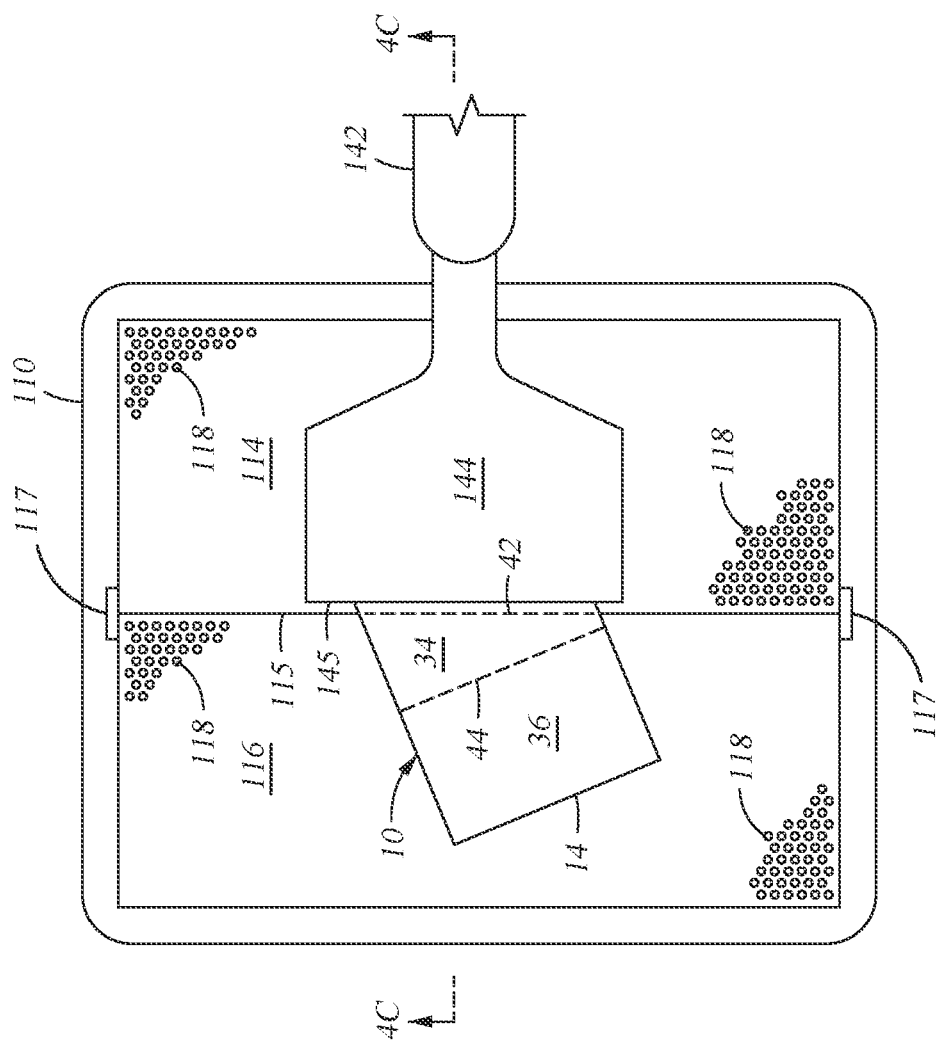
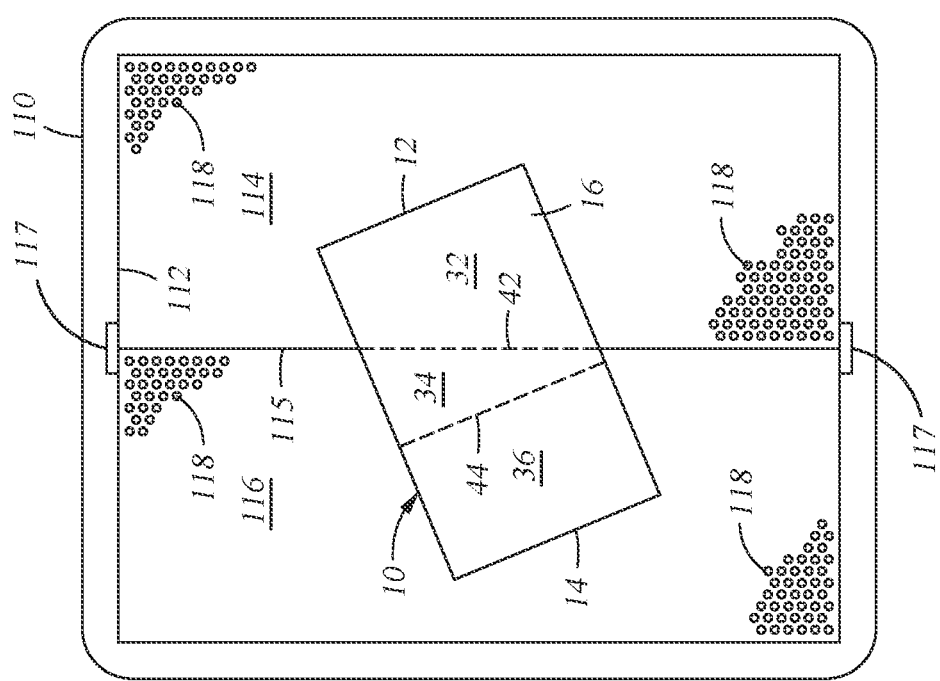
Fig. 4B
Fig. 4A

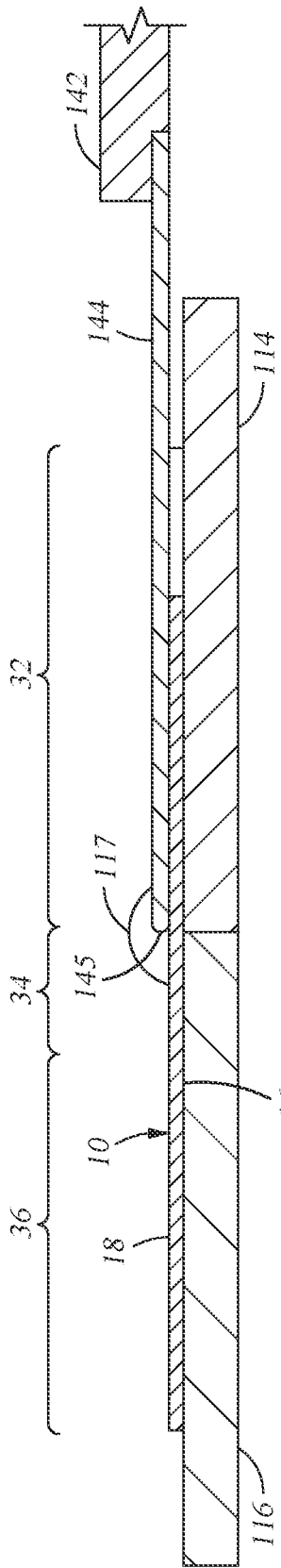
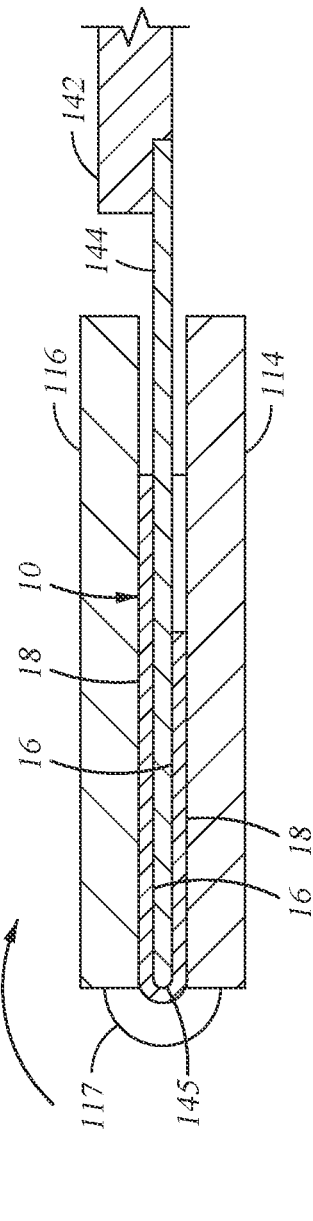
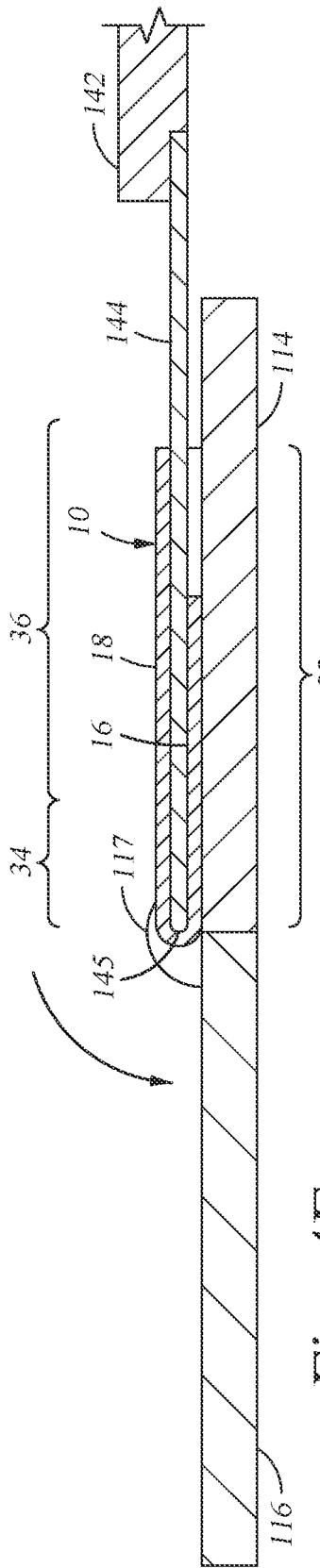
Fig. 4C
Fig. 4D
Fig. 4E

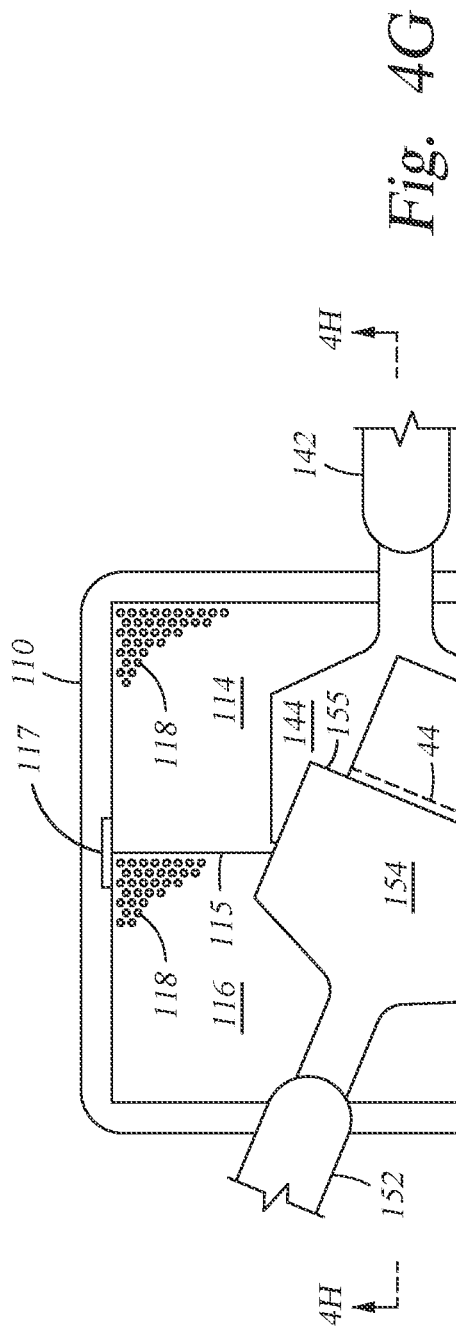
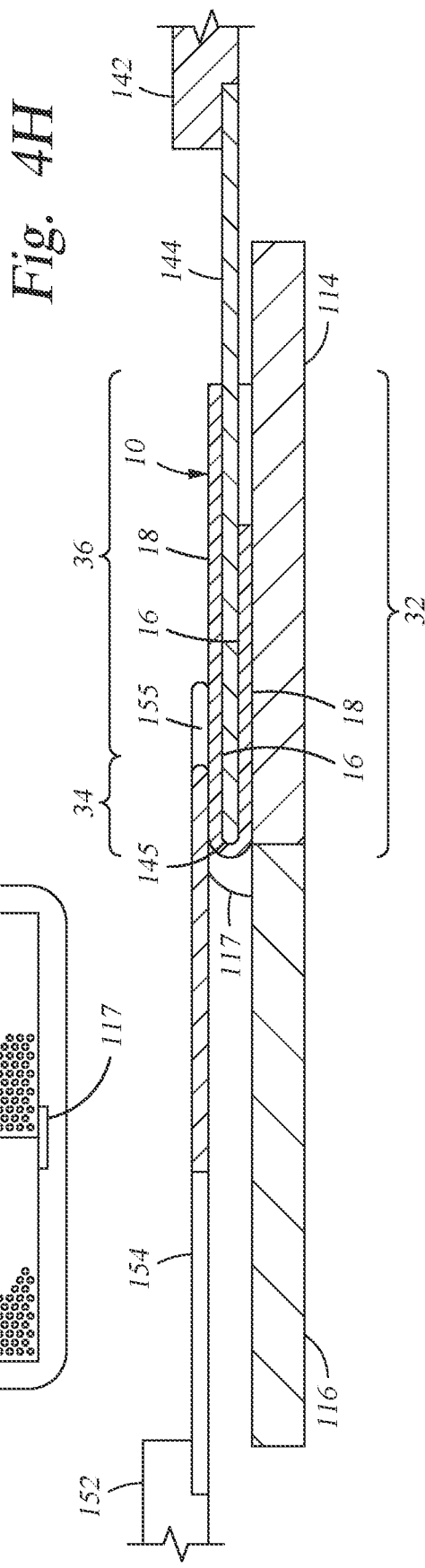

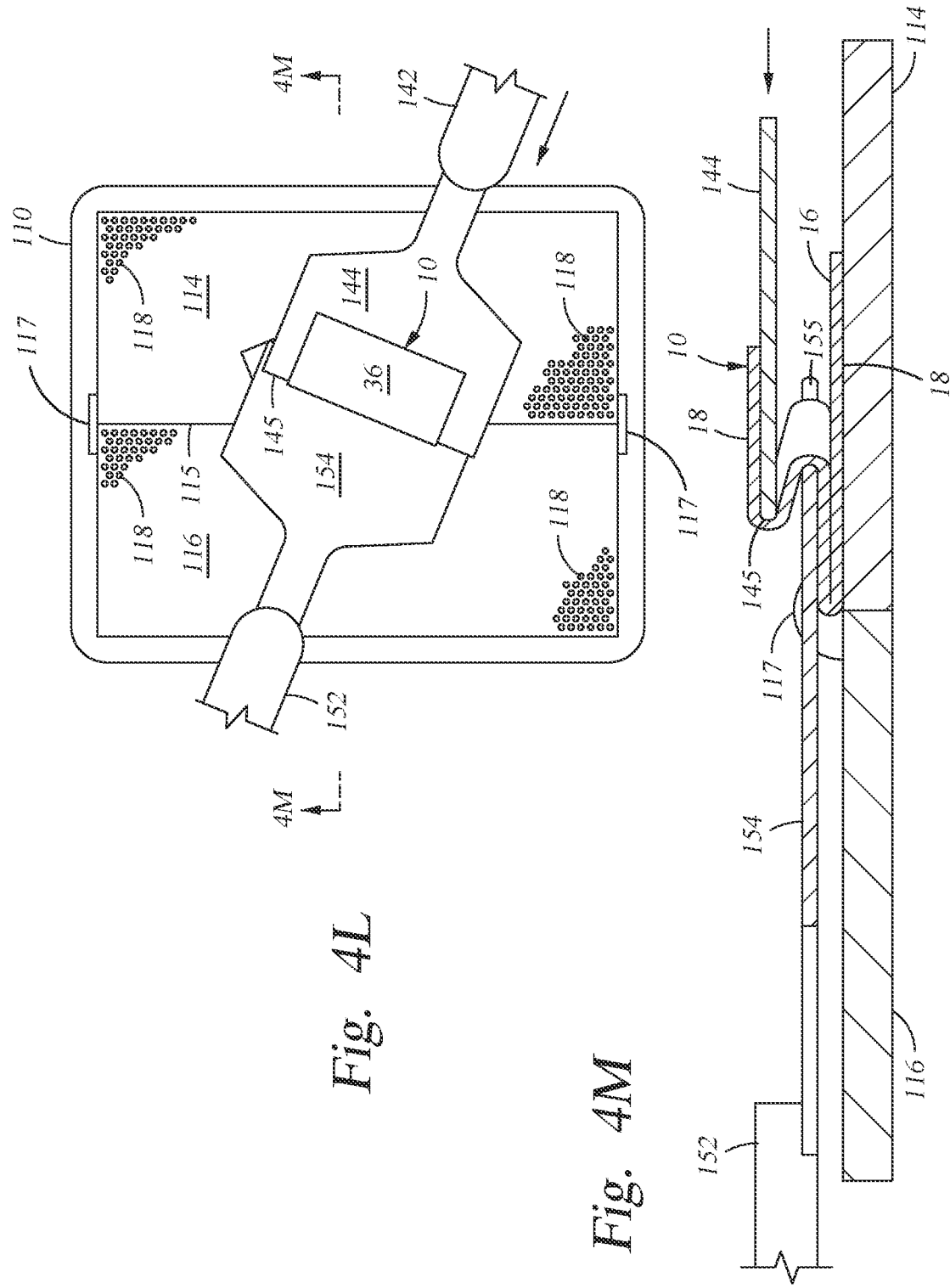

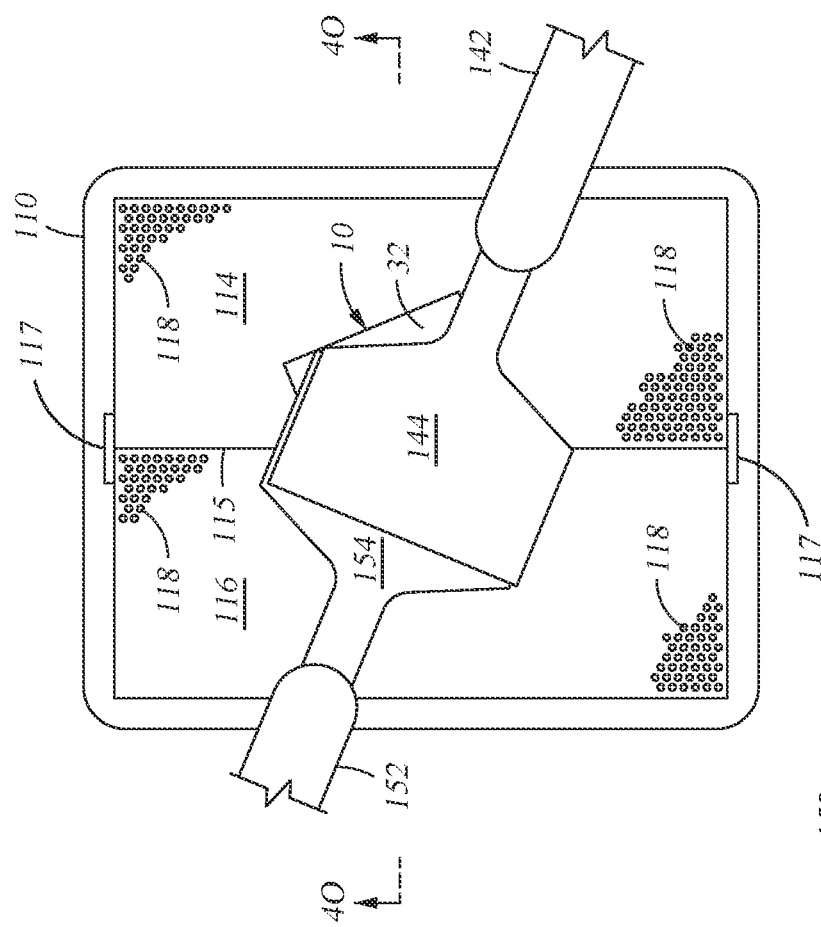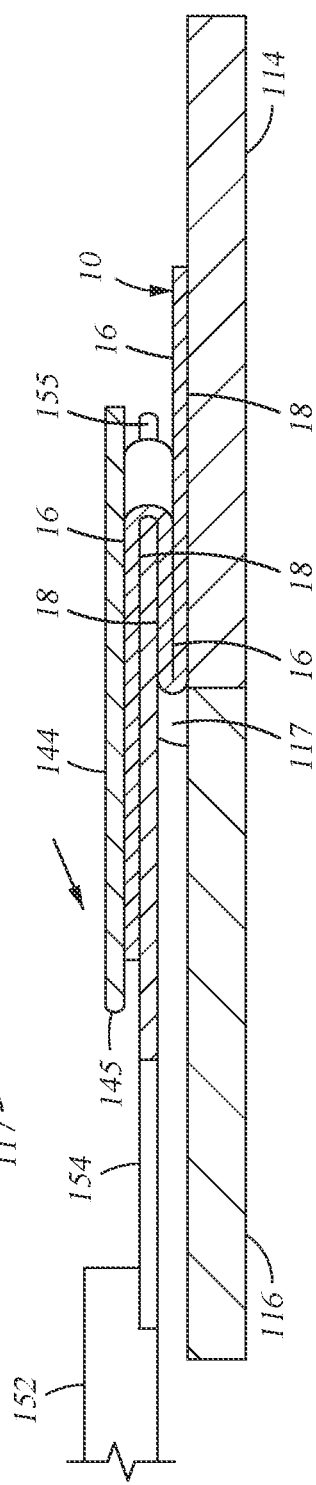

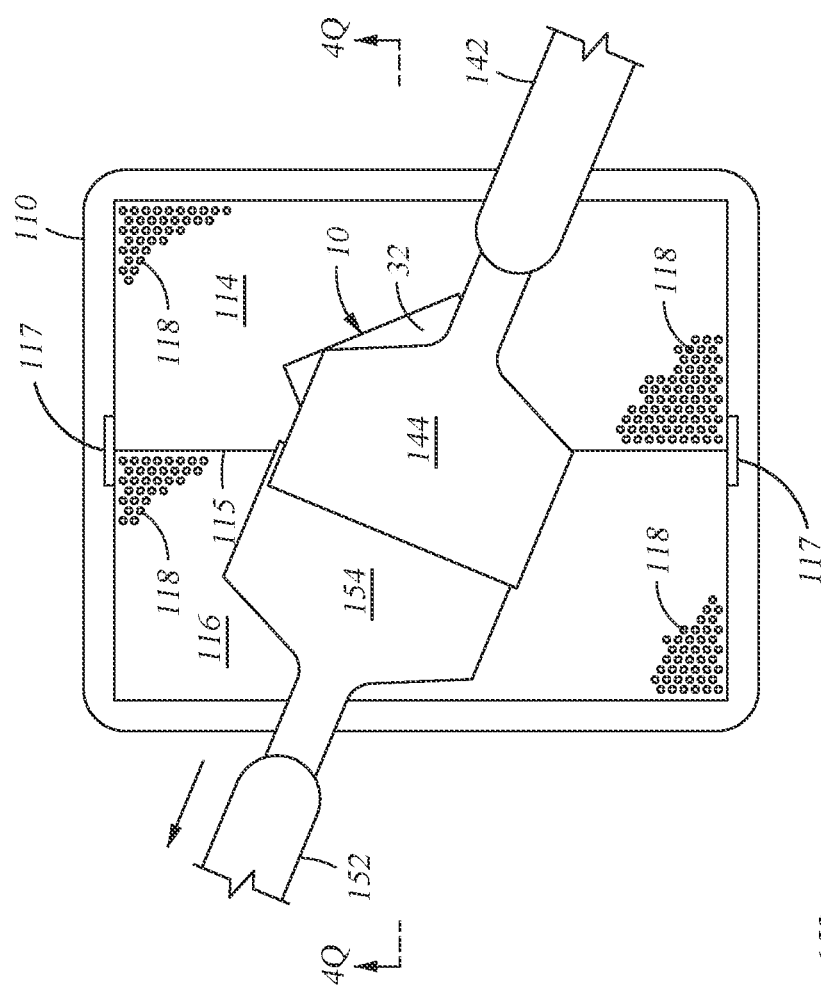
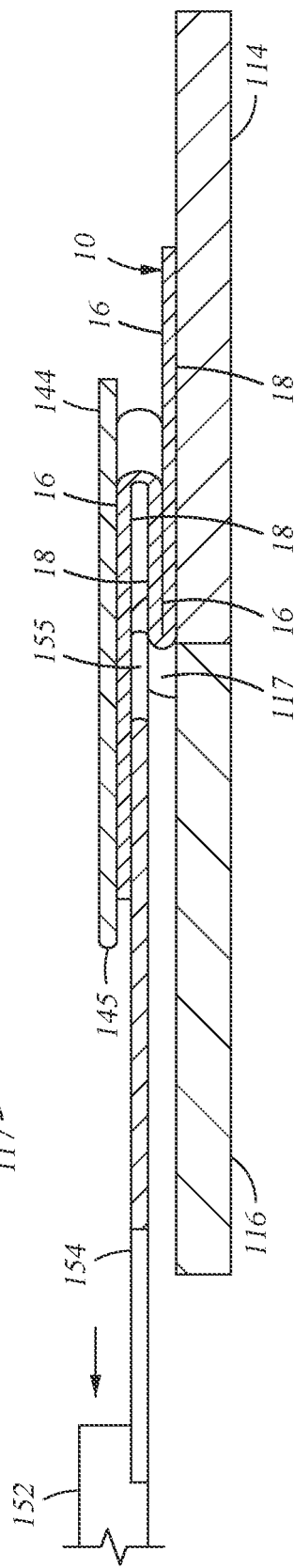

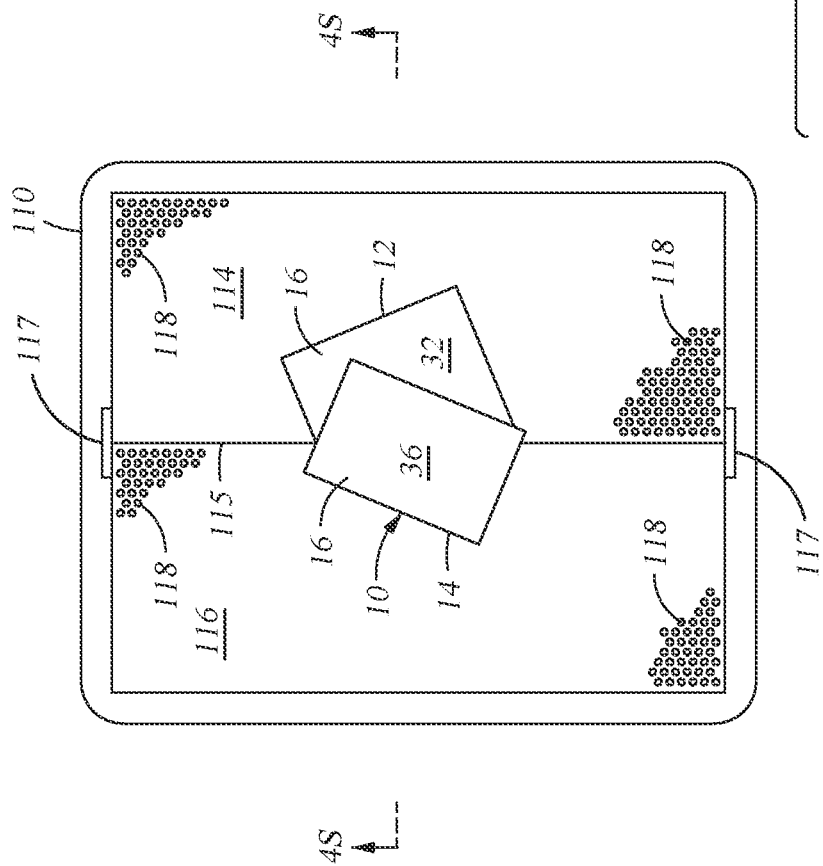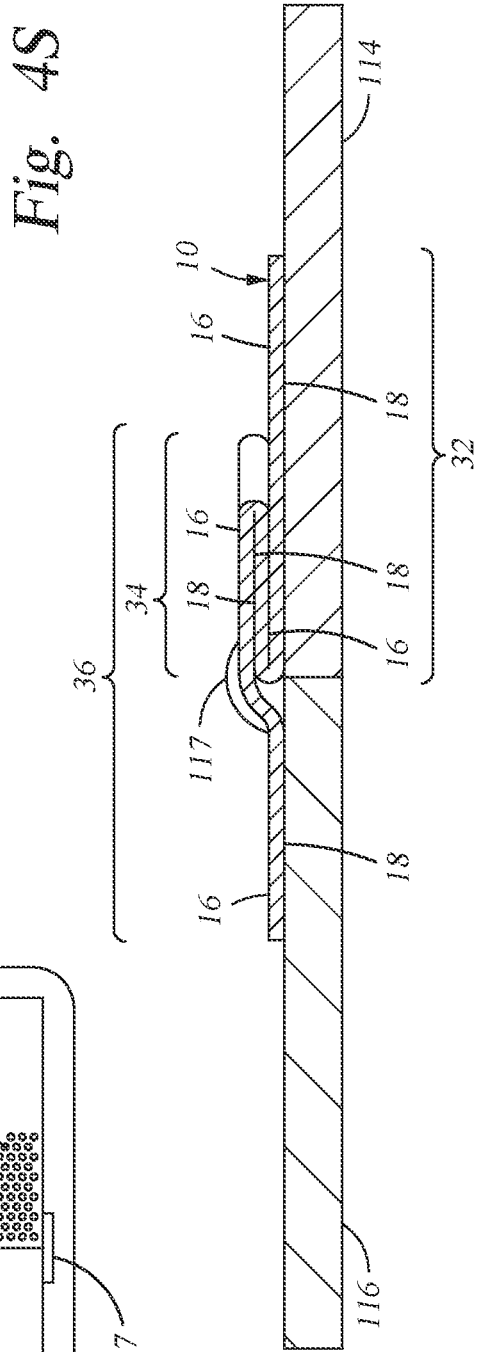

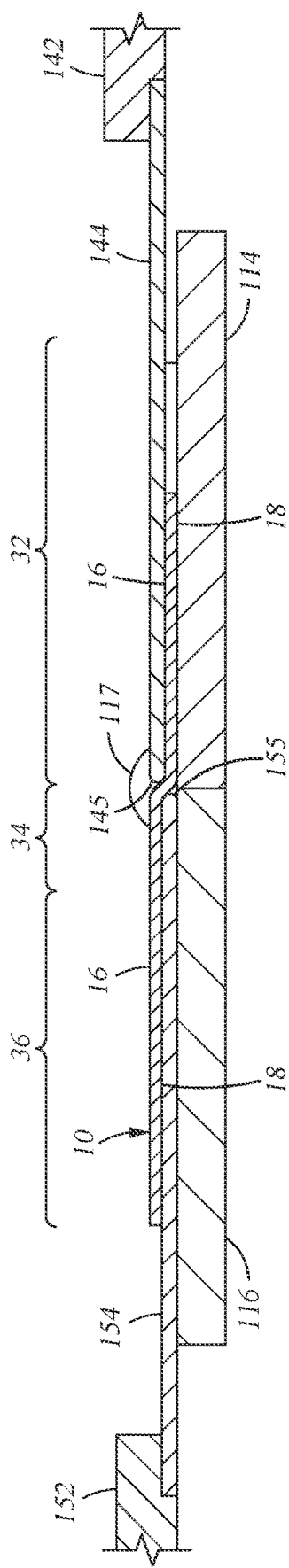
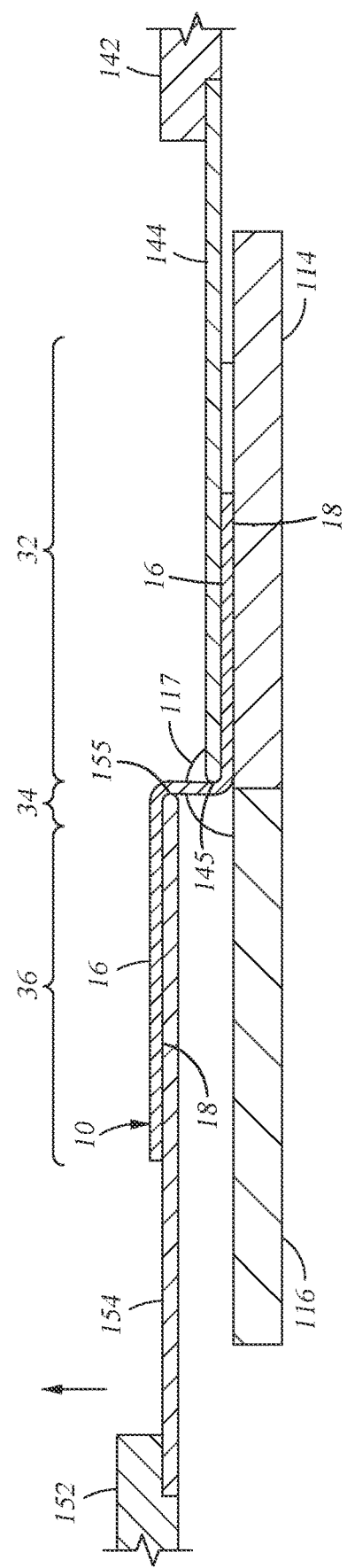
Fig. 5B
Fig. 5C

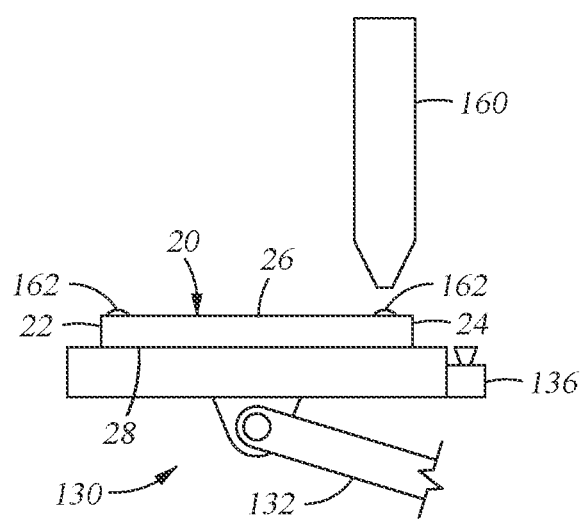
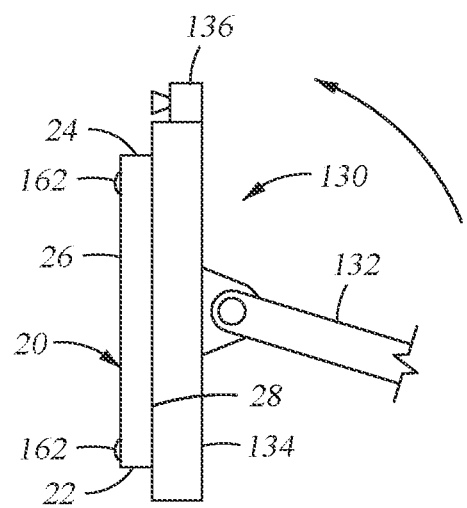
Fig. 7A
Fig. 7B
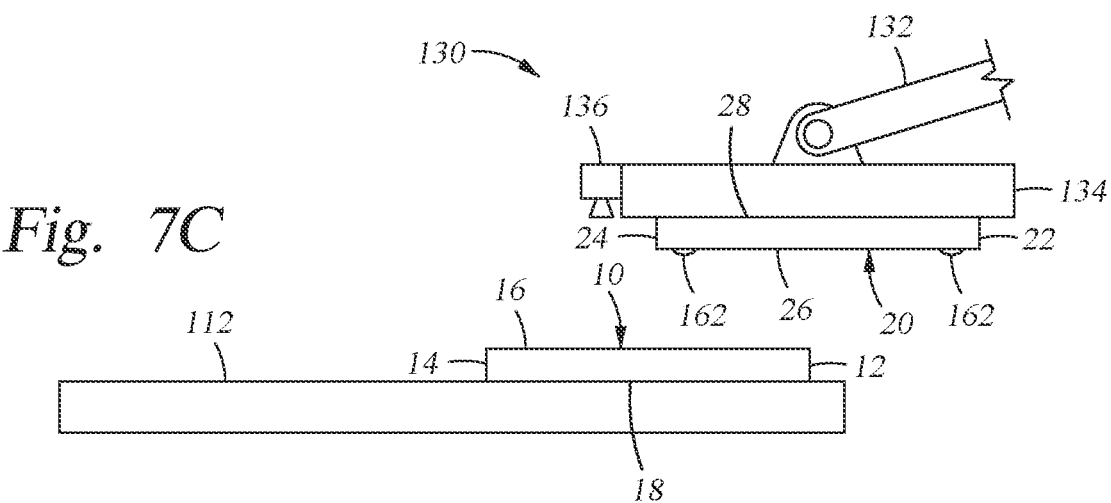
Fig. 7C
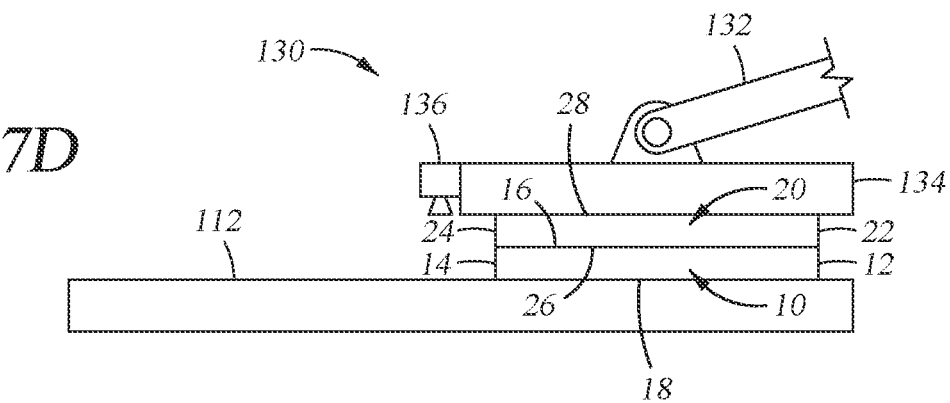
Fig. 7D

METHODS AND SYSTEMS FOR 3D FOLDING OF GARMENTS AND OTHER ARTICLES

TECHNICAL FIELD

Embodiments presented in this disclosure generally relate to apparatus, systems, and methods for manufacturing fabric articles, such as garments.

Despite technological advances and the introduction of automation in many types of manufacturing, the manufacturing of fabric articles, such as garments, remains very labor-intensive. Sewing machines were invented in the early nineteenth century and were made possible based on the development of the lock stitch sewing technique. Today, some hundred and fifty years later, this same technology remains the foundation of garment manufacturing. The modern process of producing large quantities of ready-to-wear apparels relies heavily on manual labor, and remains inefficient relative to other industrial manufacturing processes. Garment manufacturing includes multiple steps including sizing, folding, fitting, cutting, sewing, and material handling. The unique and varied properties of individual fabrics, such as weight, thickness, strength, stretch, and drape, as well as the complex nature of certain tasks, complicates material handling and automated garment manufacturing.

In most small and large apparel manufacturing factories, most of the material handling and apparel manufacturing operations are conducted in a manual or semi-manual manner. The garment manufacturing process may start with laying out a web of fabric for 24 hours to relax the fabric and remove wrinkles. Then, one or more layers of fabric may be cut based on patterns and dimensions matching the desired garment. Then, the cut fabric pieces are transferred from workstation to workstation, where at each workstation, one, two, or more pieces of fabrics are manually folded, overlapped along the seams and fed into a sewing machine or serger machine (also referred to as an overlock machine). Given the variety of fabrics, threads, seam types, and stitch types found in a finished garment, a larger number of workstations with specialized tools and skilled operators is required for assembling a garment. This means the fabrics or unfinished garments spend much time in transit between workstations, which adversely affects the time required to complete a garment. Thus, traditional apparel manufacturing operations may include multiple sequential processes. Further, a time constant may be required between each operation to allow the fabric to relax, which further increases the time required to process a garment.

Despite advances in technology, machines still struggle with performing certain tasks that are easily handled by a trained worker with average hand-eye coordination skills. This is one reason the garment manufacturing industry is in a constant search of cheaper human labor rather than investing in advanced automated manufacturing systems. To increase production, a factory may add additional production lines in parallel, which does little to improve efficiency. Even in large factories, most work is performed in piecemeal fashion with limited coordination between various stations/steps, and movement of material between each station requires a great deal of manual product handling.

Accordingly, there is a need for an automated system for manufacturing garments to improve factory throughput and reduce reliance on manual labor.

SUMMARY

Embodiments presented in this disclosure generally relate to apparatus, systems, and methods for manufacturing fabric articles, such as garments, and particularly concern the folding and joining of fabric items. In one embodiment, a method of joining fabric items includes placing a first fabric item onto a work surface such that a first portion of the first fabric item is on a first platen of the work surface, and second and third portions of the first fabric item are on a second platen of the work surface. The method further includes positioning a first fold plate onto the first portion of the first fabric item such that an edge of the first fold plate is proximate and parallel to a first fold line delineating the first and second portions, and folding the first fabric item at the first fold line. The method further includes positioning a second fold plate onto the second portion of the first fabric item such that an edge of the second fold plate is proximate and parallel to a second fold line delineating the second and third portions, and folding the first fabric item at the second fold line to create a folded first fabric item. The method further includes applying adhesive to one of the folded first fabric item or a second fabric item, and positioning the second fabric item onto the folded first fabric item, thereby joining the first and second fabric items.

In another embodiment, a method of folding a fabric item includes placing the fabric item onto a work surface that includes a first platen coupled to a second platen by a hinge. A first portion of the fabric item lays on the first platen; second and third portions of the fabric item lay on the second platen; and a first fold line delineates the first and second portions, and is proximate and parallel to a rotational axis of the hinge. The method further includes positioning a first fold plate onto the first portion of the fabric item such that an edge of the first fold plate is proximate and parallel to the first fold line, and folding the fabric item at the first fold line by pivoting the second platen about the hinge from a first position substantially coplanar with the first platen to a second position above the first platen. The method further includes positioning a second fold plate onto the second portion of the fabric item, such that an edge of the second fold plate is proximate and parallel to a second fold line delineating the second and third portions; folding the fabric item at the second fold line such that the third portion of the fabric item lays on the second fold plate; and removing the first and second fold plates while the fabric item remains folded.

In another embodiment, a system for folding a fabric article includes a table including a work surface. The work surface includes first and second platens, and each of the first and second platens includes perforations. The system further includes a vacuum system coupled to the perforations of each of the first and second platens such that a vacuum applied to the perforations of one of the first or second platen is controlled independently of a vacuum applied to the perforations of the other of the first or second platen. The system further includes a first robot including a first fold plate, a second robot including a second fold plate, a third robot configured to place a fabric article onto the work surface, and a controller configured to control the vacuum system, the first robot, the second robot, and the third robot.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

FIG. 1 schematically illustrates a system for folding a fabric item.

FIGS. 5A-5G schematically illustrate a process in which the fabric item of FIG. 2A is folded.

FIGS. 7A-7D schematically illustrate a process in which the fabric items of FIGS. 2A and 2B are joined.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 2B:
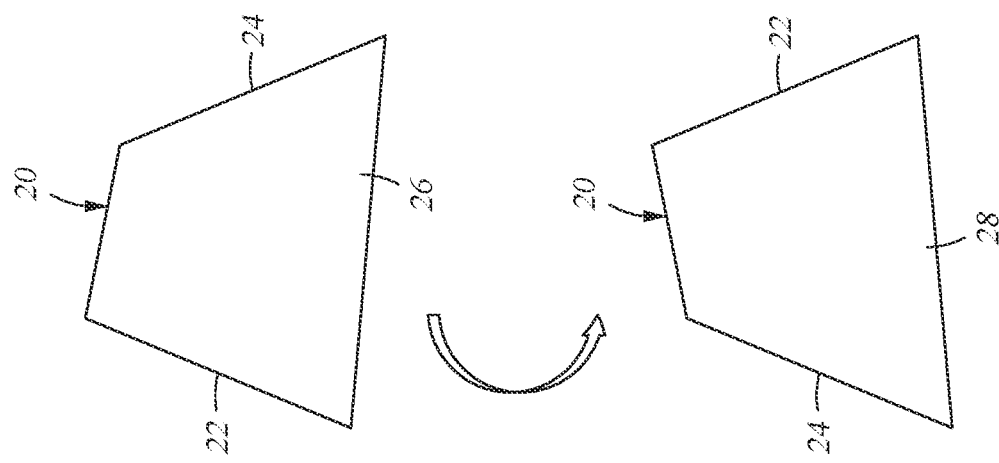
FIGS. 2A and 2B schematically illustrate fabric items that are to be joined together.

Embodiments presented in this disclosure generally relate to apparatus, systems, and methods for handling fabrics, such as textiles, such as sheet materials, such as leather, cloth, and the like, in the manufacture of articles. Some examples of such articles include, but are not limited to, garments (e.g. shirts, pants, socks, shoes, shorts, coats, jackets, skirts, dresses, underwear, hats, headbands, and the like), accessories (e.g. wallets, purses, and the like), and homewares (e.g. artwork, upholstery, towels, bed linens, blankets, mats, and the like).

Some fabrics (so-called "single-faced fabrics") include a "right side" designated to be on show in the finished article, and a "wrong side" designated to be hidden in the finished article. When such fabrics include a printed design, typically the print is applied to the right side. Additionally, when such fabrics are joined, typically the join is made right side to right side, then the joined fabrics are reversed (for example by turning inside-out) such that excess fabric at the join is hidden, and the right sides become facing outwards from each other. Some other fabrics (so-called "double-faced fabrics") are created with two right sides and no wrong sides. Such fabrics are constructed such that either of the two right sides can be designated to be on show in the finished article. Each system and method of the present disclosure includes the performance of manufacturing operations on fabric items that may be right side facing upwards or wrong side facing upwards. In some embodiments, a manufacturing operation may be performed on a fabric item that is oriented right side facing upwards. In some embodiments, a manufacturing operation may be performed on a fabric item that is oriented wrong side facing upwards.

FIG. 1 schematically illustrates a system 100 for folding a fabric item. In some embodiments, the system 100 includes a controller 102 for monitoring and controlling the operations of the system 100. The controller 102 directs the operation of one or more pieces of apparatus of the system 100. The controller 102 may include one or more software applications stored in memory and executed using one or more processors in a computing system.

The system 100 includes a folding table 110 with a work surface 112 on which operations are conducted on a fabric item. The work surface 112 includes a first platen 114 and a second platen 116. The first platen 114 and the second platen 116 are configured to selectively hold a fabric item. In the illustrated example, the first platen 114 and the second platen 116 include perforations 118 coupled to a vacuum system 104. The controller 102 controls operation of the vacuum system 104.

The first platen 114, second platen 116, and vacuum system 104 are configured such that a vacuum applied through the perforations 118 of the first platen 114 is controlled independently of a vacuum applied through the perforations 118 of the second platen 116. In an example, a vacuum may be applied through the perforations 118 of the first platen 114 while a vacuum is not applied through the perforations 118 of the second platen 116. Similarly, a vacuum may be applied through the perforations 118 of the second platen 116 while a vacuum is not applied through the perforations 118 of the first platen 114. Additionally, a vacuum applied through the perforations 118 of the first platen 114 may be controlled to be at a different strength than a vacuum applied through the perforations 118 of the second platen 116.

In some embodiments, the first platen 114 is continuous with the second platen 116, and a demarcation line 115 divides the perforations 118 of the first platen 114 and the perforations 118 of the second platen 116. In some embodiments, the first platen 114 and the second platen 116 are separate components that are coupled at the demarcation line 115. In some embodiments, the demarcation line 115 is proximate and parallel to a rotational axis of a hinge 117 coupling the first platen 114 to the second platen 116. In such embodiments, one of the first platen 114 or the second platen 116 can pivot about the hinge 117 relative to the other of the first platen 114 or the second platen 116. In at least some of such embodiments, the controller 102 controls the pivoting operation.

The system 100 includes a robot 130 configured to move fabric items onto, and remove fabric items from, the work surface 112. In some embodiments, the robot 130 may be mounted on a gantry above the work surface 112. In some embodiments, the robot 130 may be freestanding. In some embodiments, the robot 130 includes an articulated arm 132 attached to a head 134 that selectively holds and releases the fabric item. In some embodiments, the head 134 includes clamps or other grippers that selectively hold or release the fabric item. In some embodiments, the head 134 includes an electrostatic plate to selectively hold or release the fabric item. In some embodiments, the head 134 includes a vacuum assembly, such as a perforated plate coupled to a vacuum pump, to selectively hold or release the fabric item.

In some embodiments, the robot 130 includes a sensor 136 that is used to assist with positioning of the head 134 with respect to a fabric item on the work surface 112. In an example, the sensor 136 includes a camera. For instance, the camera may capture an image of the fabric item, and relay the image to the controller 102. The controller 102 may determine the position, orientation, and/or extent of the fabric item on the work surface 112. The controller 102 may direct the head 134 to the fabric item according to the determined position, orientation, and/or extent of the fabric item on the work surface 112.

The system 100 includes a first fold robot 140 configured to perform operations on a fabric item that is being folded on the work surface 112. In some embodiments, the robot 140 may be mounted on a gantry above the work surface 112. In some embodiments, the first fold robot 140 may be freestanding. In some embodiments, the first fold robot 140 includes an articulated arm 142 attached to a first fold plate 144. The first fold plate 144 is manipulated by the articulated arm 142 to perform operations on a fabric item that is being folded on the work surface 112. In some embodiments, the first fold plate 144 includes a planar surface. In some embodiments, the first fold plate 144 includes a low friction coating.

In some embodiments, the first fold robot 140 includes a sensor 146 that is used to assist with positioning of the first fold plate 144 with respect to a fabric item on the work surface 112. In an example, the sensor 146 includes a camera. For instance, the camera may capture an image of the first fold plate 144 and the fabric item, and relay the image to the controller 102. The controller 102 may determine the position and orientation of the first fold plate 144 with respect to the fabric item on the work surface 112. The controller 102 may direct the articulated arm 142 to position the first fold plate 144 with respect to the fabric item on the work surface 112.

In some embodiments, the system 100 includes a second fold robot 150 configured to perform operations on a fabric item that is being folded on the work surface 112. In some embodiments, the second fold robot 150 may be mounted on a gantry above the work surface 112. In some embodiments, the second fold robot 150 may be freestanding. In some embodiments, the second fold robot 150 includes an articulated arm 152 attached to a second fold plate 154. The second fold plate 154 is manipulated by the articulated arm 152 to perform operations on a fabric item that is being folded on the work surface 112. In some embodiments, the second fold plate 154 includes a planar surface. In some embodiments, the second fold plate 154 includes a low friction coating.

In some embodiments, the second fold robot 150 includes a sensor 156 that is used to assist with positioning of the second fold plate 154 with respect to a fabric item on the work surface 112. In an example, the sensor 156 includes a camera. For instance, the camera may capture an image of the second fold plate 154 and the fabric item, and relay the image to the controller 102. The controller 102 may determine the position and orientation of the second fold plate 154 with respect to the fabric item on the work surface 112. The controller 102 may direct the articulated arm 152 to position the second fold plate 154 with respect to the fabric item on the work surface 112.

In some embodiments, the system 100 includes one or more cameras 122. The one or more cameras 122 may be used to monitor operations being performed on a fabric item on the work surface 112. The controller 102 may use images captured by the one or more cameras 122 in controlling operation of any one or more of the first platen 114, the second platen 116, the vacuum system 104, the robot 130, the first fold robot 140, or the second fold robot 150.

Figure 2A:
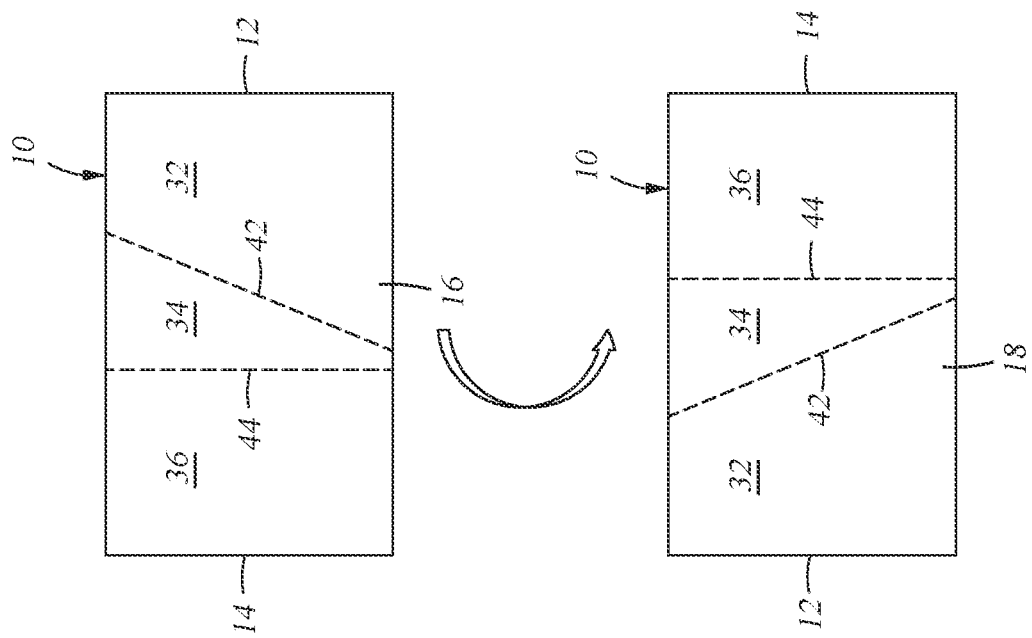

FIGS. 2A and 2B schematically illustrate first and second fabric items 10, 20 that are to be joined together. FIG. 2A depicts the first fabric item 10. The upper portion of the Figure shows the bonding side 16 (the side that is to be joined to the second fabric item 20). The lower portion of the Figure shows the reverse side 18 (the side opposite to the bonding side 16). In the example operations described herein, the first fabric item 10 is to be joined to the second fabric item 20 along a first edge 12 and along a second edge 14. In some embodiments, the first fabric item 10 may be joined to the second fabric item 20 along only one edge, or along one or more different edges to those depicted. In some embodiments, the first fabric item 10 may be joined to the second fabric item 20 at any one or more places of the first fabric item 10 or the second fabric item 20.

The first fabric item 10 includes a first portion 32, a second portion 34, and a third portion 36. A first fold line 42 delineates the first portion 32 and the second portion 34. In some embodiments, the first fold line 42 is represented by one or more marks on at least one of the bonding side 16 or the reverse side 18 of the first fabric item 10. In some embodiments, the first fold line 42 is not represented by any marks on the bonding side 16 or on the reverse side 18 of the first fabric item 10. A second fold line 44 delineates the second portion 34 and the third portion 36. In some embodiments, the second fold line 44 is represented by one or more marks on at least one of the bonding side 16 or the reverse side 18 of the first fabric item 10. In some embodiments, the second fold line 44 is not represented by any marks on the bonding side 16 or on the reverse side 18 of the first fabric item 10.

FIG. 2B depicts the second fabric item 20. The upper portion of the Figure shows the bonding side 26 (the side that is to be joined to the first fabric item 10). The lower portion of the Figure shows the reverse side 28 (the side opposite to the bonding side 26). In the example operations described herein, the second fabric item 20 is to be joined to the first fabric item 10 along a first edge 22 and along a second edge 24. In some embodiments, the second fabric item 20 may be joined to the first fabric item 10 along only one edge, or along one or more different edges to those depicted. In some embodiments, the second fabric item 20 may be joined to the first fabric item 10 at any one or more places of the second fabric item 20 or the first fabric item 10.

In the illustrated example, the first edge 12 of the first fabric item 10 is to be joined to the first edge 22 of the second fabric item 20, and the second edge 14 of the first fabric item 10 is to be joined to the second edge 24 of the second fabric item 20. However, the first fabric item 10 and the second fabric item 20 are of different shapes and sizes. Without manipulating the first fabric item 10, the second fabric item 20 cannot be positioned onto the first fabric item 10 such that the first edge 22 of the second fabric item 20 is aligned with and overlays the first edge 12 of the first fabric item 10 when the second edge 24 of the second fabric item 20 is aligned with and overlays the second edge 14 of the first fabric item 10. In the illustrated example, and as described below, the first fabric item 10 is folded before the first fabric item 10 is joined to the second fabric item 20.

Figure 3:
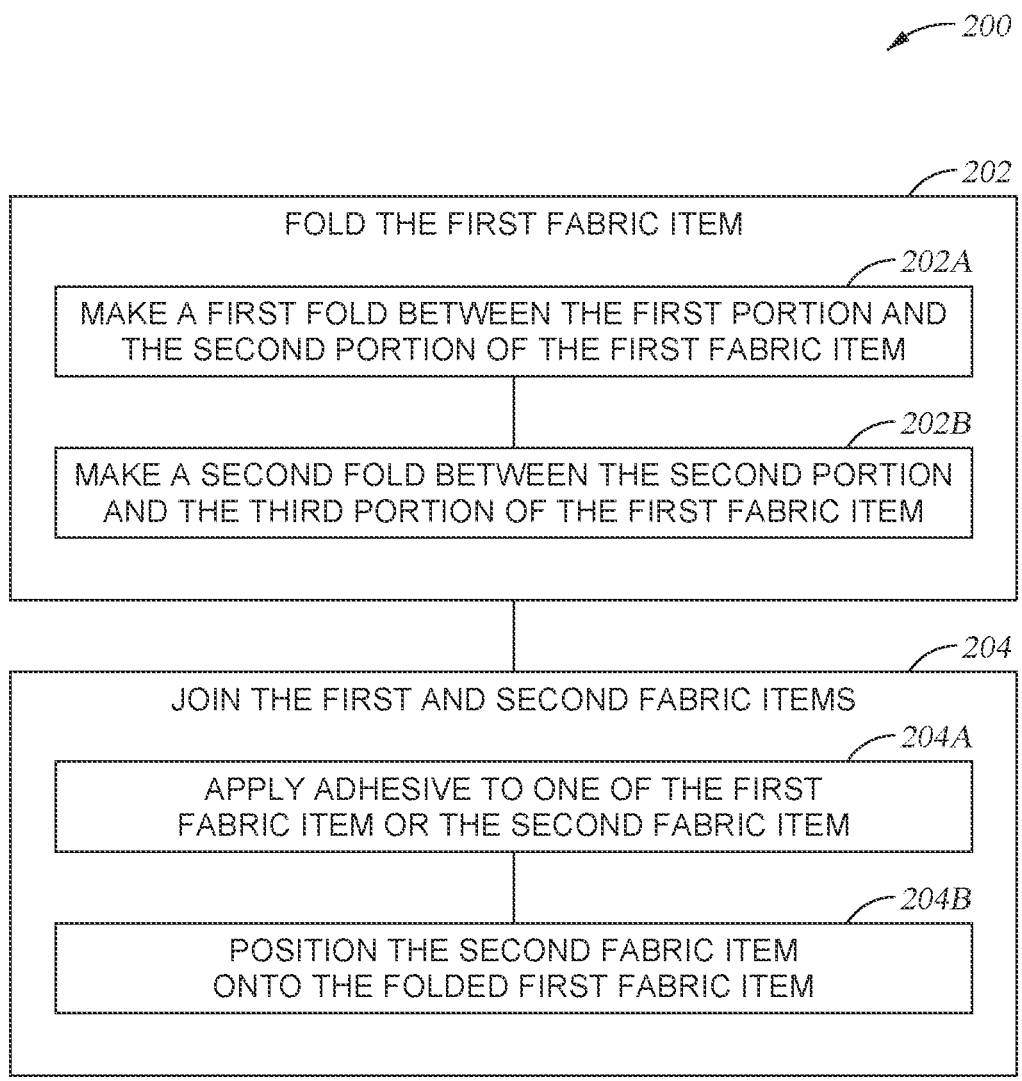
FIG. 3 is a flow chart of a method of joining two fabric items.

FIG. 3 is a flow chart of a method 200 of joining the first fabric item 10 to the second fabric item 20. At operation 202, the first fabric item 10 is folded such that the relative positions of the first edge 12 and the second edge 14 each match the relative positions of the first edge 22 and the second edge 24, respectively, of the second fabric item 20. In the illustrated example, operation 202 involves two secondary operations, operation 202A and operation 202B. At operation 202A, a first fold is made between the first portion 32 and the second portion 34 of the first fabric item 10. At operation 202B, a second fold is made between the second portion 34 and the third portion 36 of the first fabric item 10.

At operation 204, the first and second fabric items 10, 20 are joined. The first edge 12 of the first fabric item 10 is aligned with the first edge 22 of the second fabric item 20.

The second edge 14 of the first fabric item 10 is aligned with the second edge 24 of the second fabric item 20. In some embodiments, the first and second edges 12, 14 of the first fabric item 10 overlay the corresponding first and second edges 22, 24 of the second fabric item 20. In some embodiments, the first and second edges 22, 24 of the second fabric item 20 overlay the corresponding first and second edges 12, 14 of the first fabric item 10.

In the illustrated example, operation 204 involves two secondary operations, operation 204A and operation 204B. At operation 204A, adhesive is applied to one of the first fabric item 10 or the second fabric item 20. At operation 204B, one of the first or second fabric item 10, 20 is positioned onto the other of the first or second fabric item 10, 20.

Figure 4F:
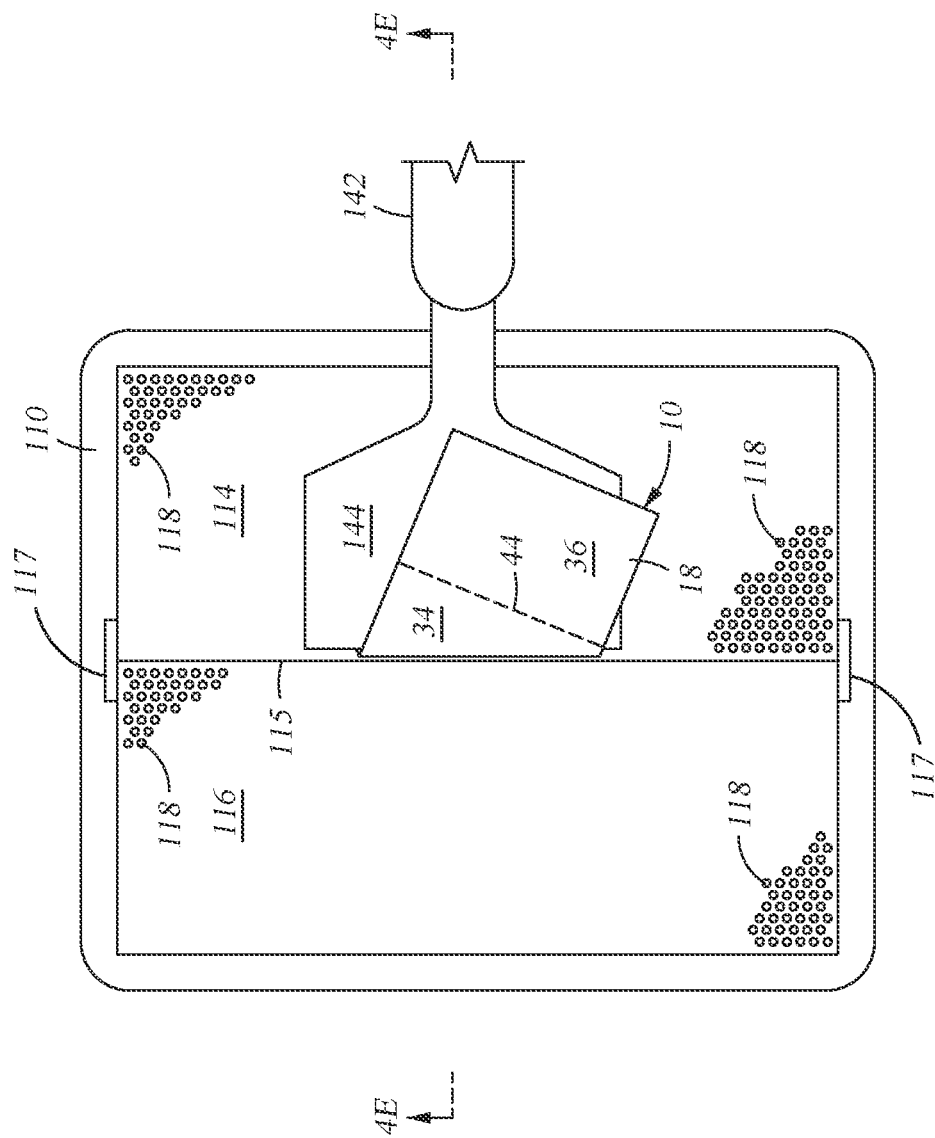
FIGS. 4A-4S schematically illustrate a process in which the fabric item of FIG. 2A is folded.

FIGS. 4A-4S schematically illustrate the folding operation 202 in some embodiments. FIGS. 4A, 4B, 4F, 4G, 4I, 4L, 4N, 4P, and 4R are schematic plan views of the first fabric item 10 on the work surface 112 of the folding table 110. FIGS. 4C-4E, 4H, 4J, 4K, 4M, 4O, 4Q, and 4S are schematic cross-sectional views along line AA depicted in FIG. 4A. In FIGS. 4C-4E, 4H, 4J, 4K, 4M, 4O, 4Q, and 4S, the thickness of the first fabric item 10 and the separations between the folded layers of the first fabric item 10 are exaggerated for clarity. In FIGS. 4A-4S, the first platen 114 and the second platen 116 are coupled to the hinge 117.

In FIG. 4A, the first fabric item 10 is placed onto the work surface 112. In some embodiments, the robot 130 places the first fabric item 10 onto the work surface 112. The bonding side 16 of the first fabric item 10 is shown facing upwards. The first portion 32 of the first fabric item 10 is positioned on the first platen 114, and the second and third portions 34, 36 of the first fabric item 10 are positioned on the second platen 116. In some embodiments, the first portion 32 of the first fabric item 10 is held on the first platen 114 by the application of a vacuum, as described above. In some embodiments, the second and third portions 34, 36 of the first fabric item 10 are held on the second platen 116 by the application of a vacuum, as described above.

The first fold line 42 of the first fabric item 10 is proximate and parallel to the demarcation line 115. The first fold line 42 is proximate and parallel to the rotational axis of the hinge 117. In some embodiments, the first fold line 42 includes an image projected onto the bonding side 16 of the first fabric item 10. In an example, a line of light representing the first fold line 42 is shone onto the bonding side 16 of the first fabric item 10.

FIG. 4B shows placement of the first fold plate 144 onto the first portion 32 of the first fabric item 10. The first fold plate 144 is positioned such that an edge 145 of the first fold plate 144 is proximate and parallel to the first fold line 42. In some embodiments, the first portion 32 of the first fabric item 10 is held on the first platen 114 at least in part by the application of a force by the first fold plate 144 onto the first portion 32 of the first fabric item 10. FIG. 4C shows a schematic cross-sectional view corresponding to the schematic plan view depicted in FIG. 4B.

FIGS. 4D and 4E schematically depict the making of the first fold at the first fold line 42. The first fold is made by pivoting the second platen 116 about the hinge 117. The second and third portions 34, 36 of the first fabric item 10 are held on the second platen 116 (such as by a vacuum, as described above) while pivoting the second platen 116 from a first position substantially coplanar with the first platen 114 to a second position above the first platen 114. The first fold plate 144 remains in place with the edge 145 proximate to the first fold line 42 during the pivoting of the second platen 116.

FIG. 4D shows the second platen 116 in the second position above the first platen 114. The second and third portions 34, 36 of the first fabric item 10 are on the first fold plate 144. The bonding side 16 of the second and third portions 34, 36 faces the first fold plate 144, and the reverse side 18 of the second and third portions 34, 36 faces upwards. After the second platen 116 reaches the second position, the second and third portions 34, 36 of the first fabric item 10 are released from the second platen (such as by releasing the vacuum). Then the second platen 116 is pivoted from the second position back to the first position, leaving the second and third portions 34, 36 of the first fabric item 10 on the first fold plate 144. FIG. 4E shows the second platen 116 back in the first position, and the second and third portions 34, 36 of the first fabric item 10 are on the first fold plate 144. FIG. 4F shows a schematic plan view corresponding to the schematic cross-sectional view depicted in FIG. 4E.

FIG. 4G shows placement of the second fold plate 154 onto the second portion 34 of the first fabric item 10. The second fold plate 154 is positioned such that an edge 155 of the second fold plate 154 is proximate and parallel to the second fold line 44. The first fold plate 144 remains in place with the edge 145 proximate to the first fold line 42 while the second fold plate 154 is positioned proximate and parallel to the second fold line 44. FIG. 4H shows a schematic cross-sectional view corresponding to the schematic plan view depicted in FIG. 4G.

Figure 4I:
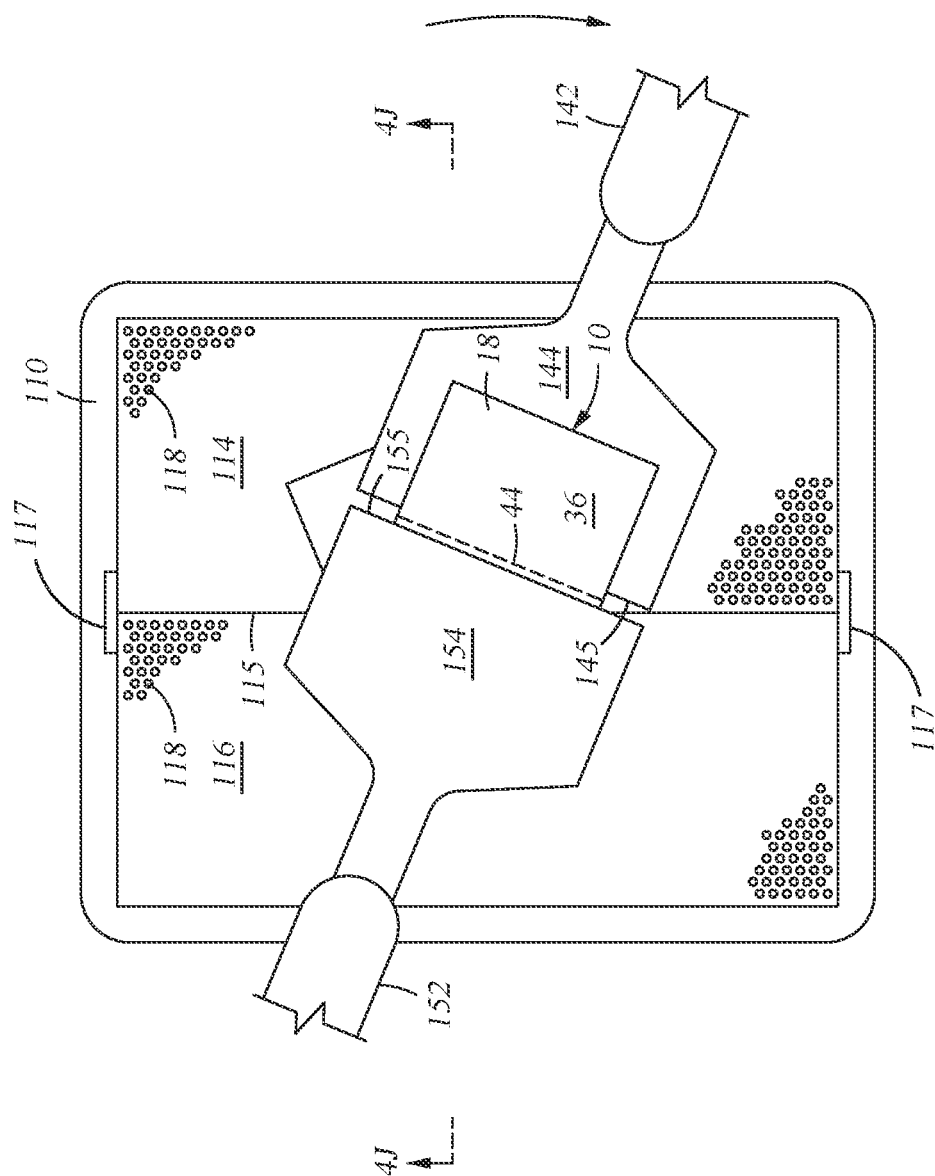
Figure 4J:
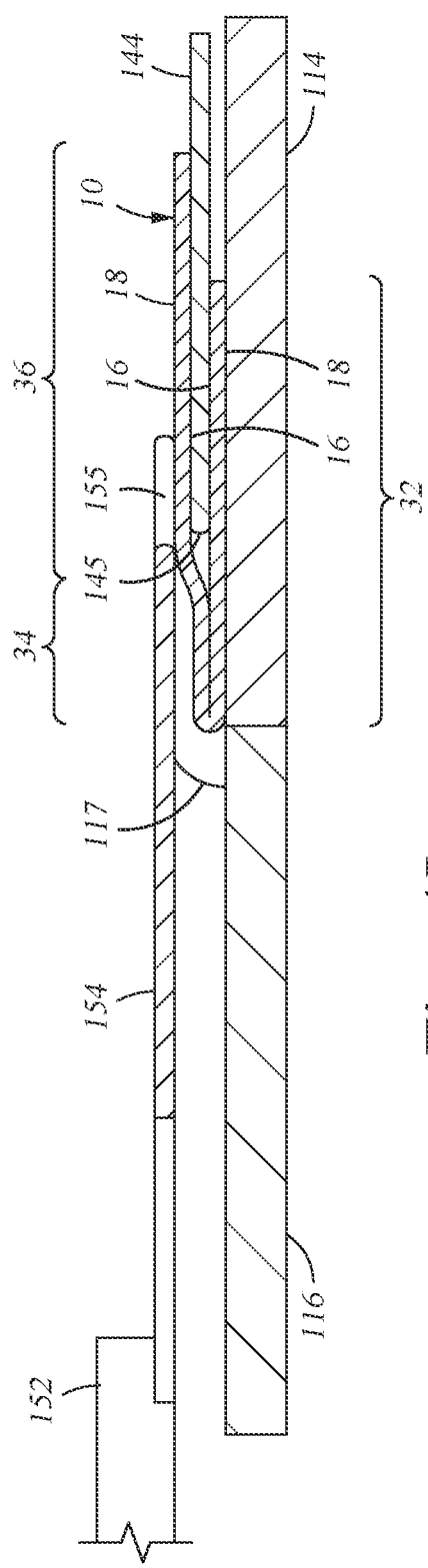

FIG. 4I shows the positioning of the first fold plate 144 such that the edge 145 is proximate and parallel to the second fold line 44. The second fold plate 154 remains in place on the second portion 34 of the first fabric item 10 with the edge 155 proximate to the second fold line 44 while the first fold plate 144 is positioned proximate and parallel to the second fold line 44. As illustrated, the first fold plate 144 is moved laterally from below the second portion 34 of the first fabric item 10 while the first portion 32 of the first fabric item 10 is held on the first platen 114. In some embodiments, the first portion 32 is held on the first platen 114 by a vacuum, as described above. The first fold plate 144 remains below the third portion 36 of the first fabric item 10 during the positioning. As illustrated, the second fold line 44 is between the edge 145 of the first fold plate 144 and the edge 155 of the second fold plate 154. FIG. 4J shows a schematic cross-sectional view corresponding to the schematic plan view depicted in FIG. 4I.

Figure 4K:
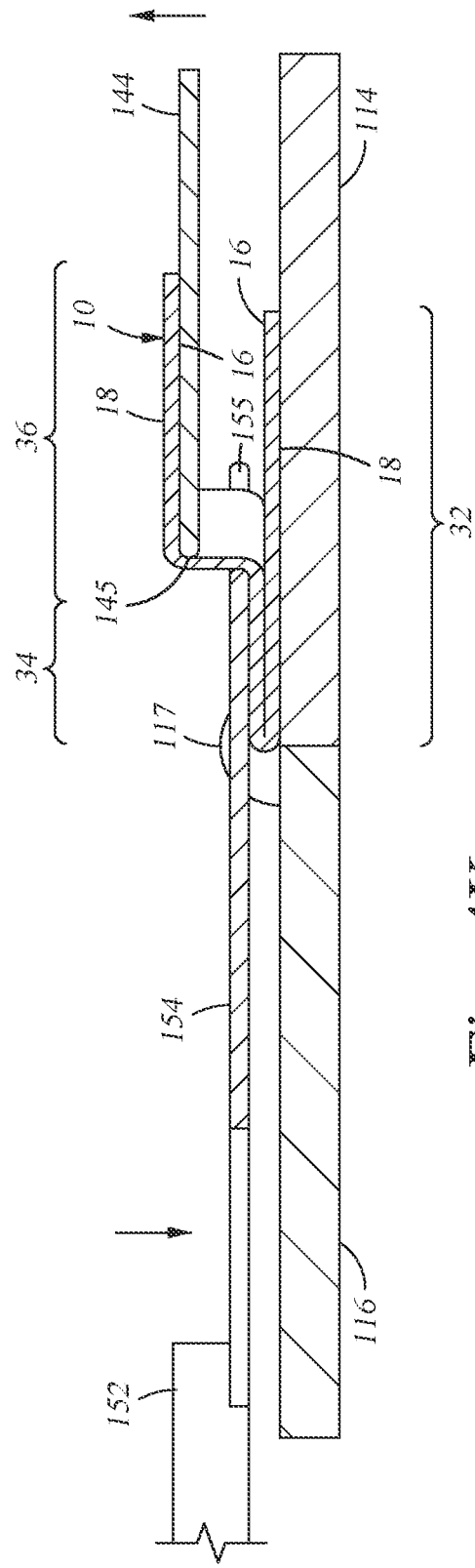

FIGS. 4K-4O schematically depict the making of the second fold at the second fold line 44. The second fold is created by placing the third portion 36 onto the second fold plate 154 such that the reverse side 18 of the third portion 36 faces the second fold plate 154 and the bonding side 16 of the third portion 36 faces upwards. FIG. 4K depicts raising the first fold plate 144 off the first portion 32 of the first fabric item 10 while the second fold plate 154 remains in place on the second portion 34 of the first fabric item 10. The first fold plate 144 is maintained substantially parallel to the first platen 114. The third portion 36 of the first fabric item 10 is lifted upwards by the first fold plate 144. The first portion 32 of the first fabric item 10 remains on the first platen 114. In some embodiments, the first portion 32 is held on the first platen 114 by a vacuum, as described above. The second portion 34 of the first fabric item 10 remains on the first portion 32. In some embodiments, the second portion 34 is held on the first portion 32 at least in part by a vacuum applied at the first platen 114, as described above, and effected through a weave of the fabric material of the first portion 32. In some embodiments, the second portion 34 is held on the first portion 32 at least in part by a force applied by the second fold plate 154.

FIGS. 4L and 4M depict the subsequent moving of the first fold plate 144 to place the third portion 36 onto the second fold plate 154. The first fold plate 144 is moved over the second fold plate 154 in a direction substantially perpendicular to the second fold line 44. The first fold plate 144 is maintained substantially parallel to the first platen 114 while being moved over the second fold plate 154. The second portion 34 of the first fabric item 10 remains on the first portion 32 and below the second fold plate 154, as described above. While the first fold plate 144 is being moved, the third portion 36 of the first fabric item 10 slides around the edge 145 of the first fold plate 144 to become placed onto the second fold plate 154.

FIGS. 4N and 4O depict the result of the moving of the first fold plate 144 over the second fold plate 154. The third portion 36 of the first fabric item 10 is between the first fold plate 144 and the second fold plate 154. The reverse side 18 of the third portion 36 faces the second fold plate 154, and the bonding side 16 of the third portion 36 faces upwards.

Then the first and second fold plates 144, 154 are removed from the first fabric item 10. In some embodiments, the first fold plate 144 is removed before the second fold plate 154. In some embodiments, the second fold plate 154 is removed before the first fold plate 144. FIGS. 4P and 4Q depict the removal of the second fold plate 154 while the first fold plate 144 remains in place on the third portion 36 of the first fabric item 10. The second fold plate 154 is removed by sliding the second fold plate 154 laterally while maintaining the second fold plate 154 substantially parallel to the second platen 116. While the second fold plate 154 is being removed, the first portion 32 of the first fabric item 10 remains on the first platen 114 and the second portion 34 remains on the first portion 32, as described above. In some embodiments, the first fold plate 144 applies a force onto the third portion 36, which maintains the third portion 36 in place, while the second fold plate 154 is being removed. After removing the second fold plate 154, the first fold plate 144 is removed from the first fabric item 10, such as by lifting, by sliding, or by a combination of lifting and sliding the first fold plate 144.

FIGS. 4R and 4S depict the folded first fabric item 10 after removing the first and second fold plates 144, 154. The bonding side 16 of the first portion 32 and the third portion 36 faces upwards. The second portion 34 is sandwiched between the first and third portions 32, 36.

Figure 5A:
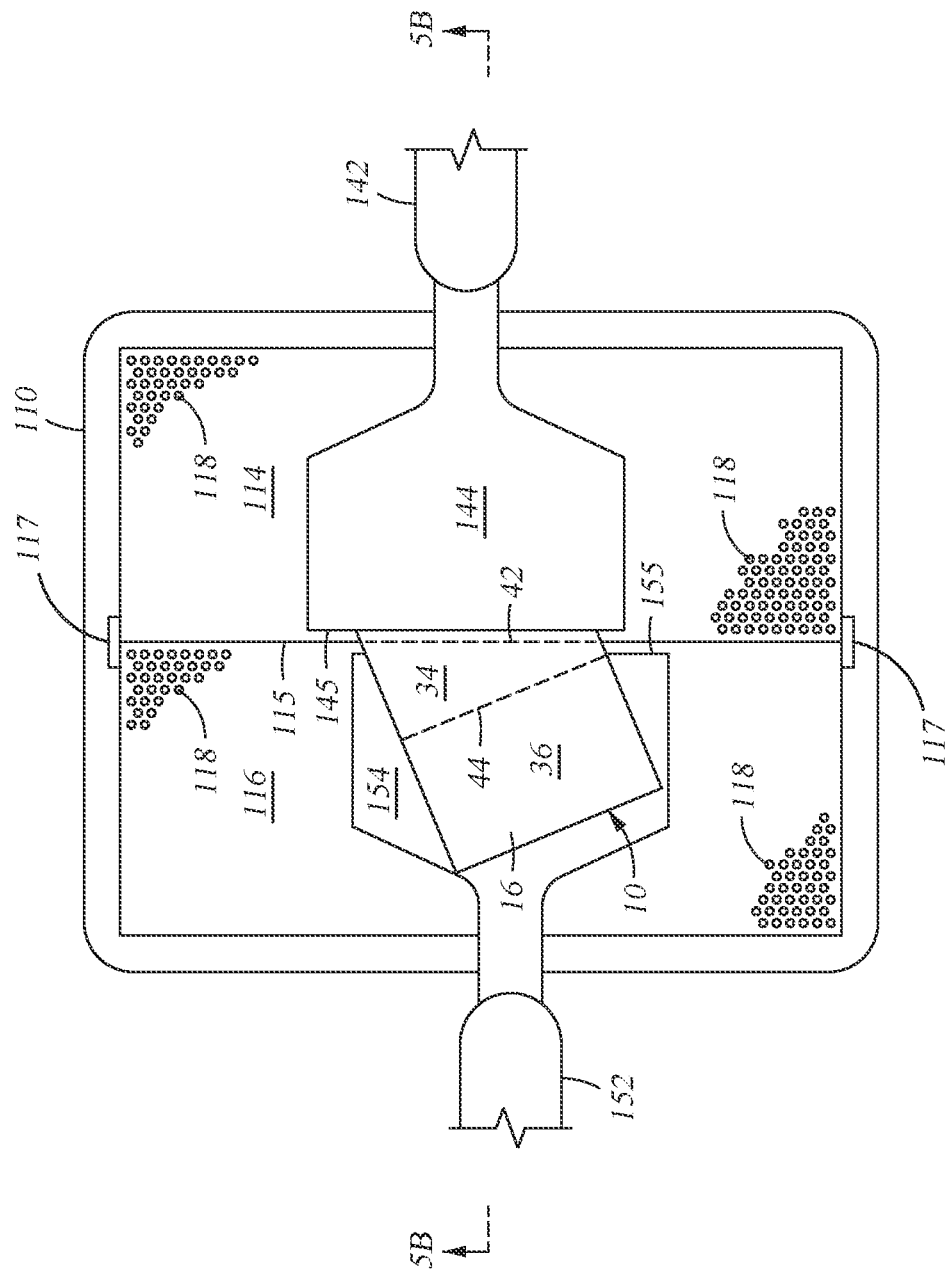
Figure 5D:
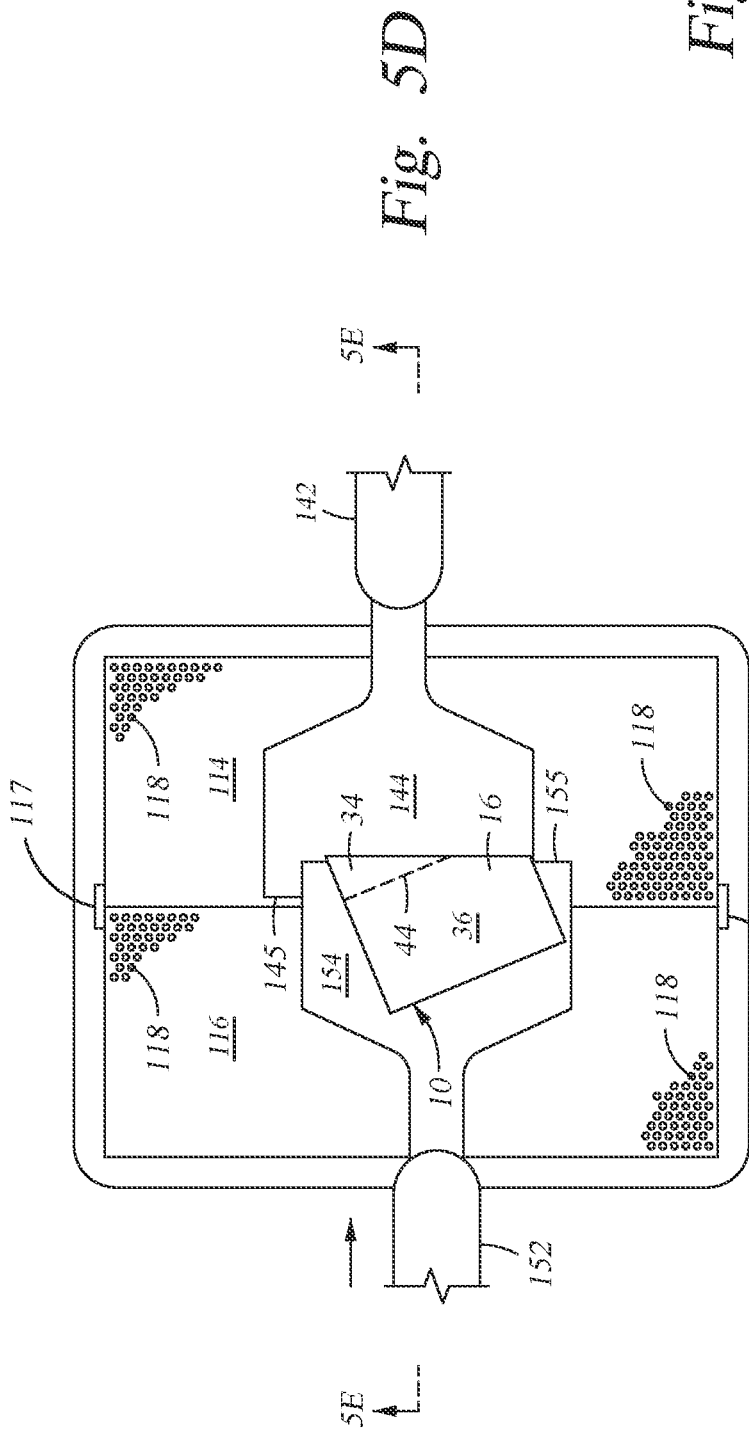
Figure 5E:
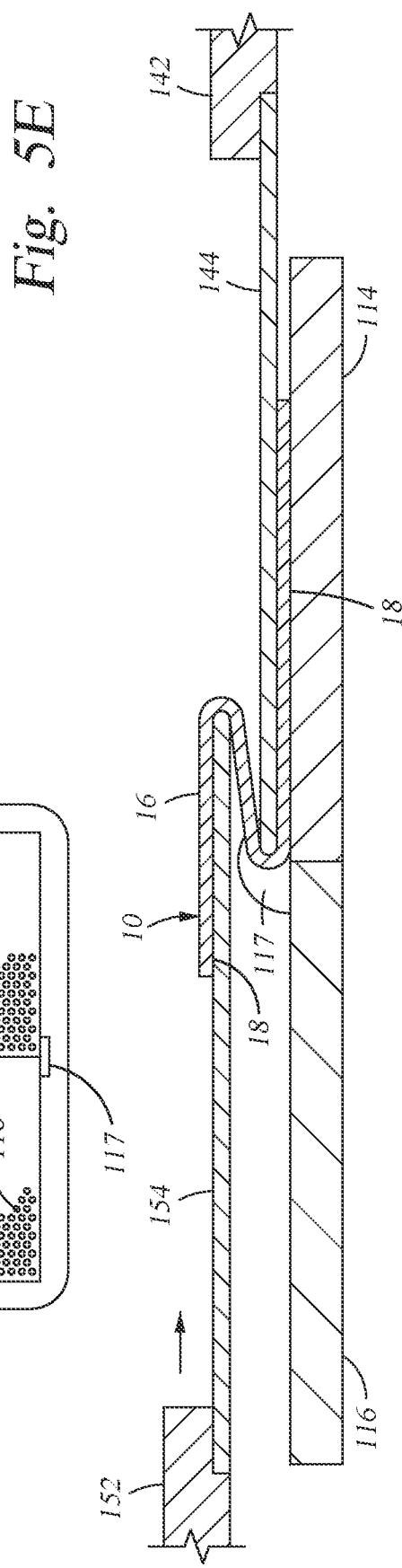
Figure 5F:
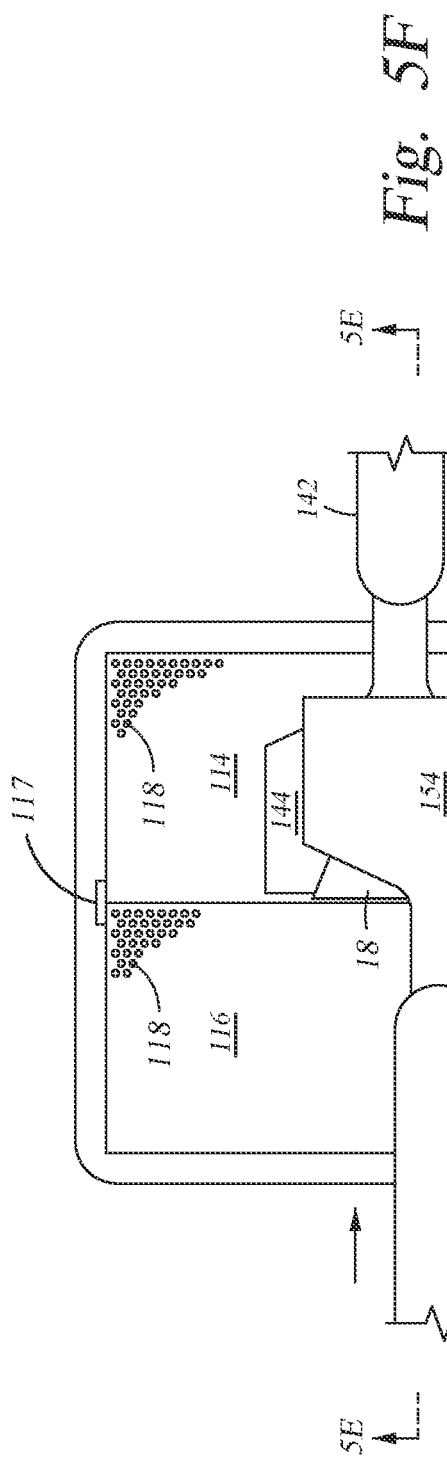

FIGS. 5A-5G schematically illustrate an alternative process for making the first fold in the folding operation 202A of FIG. 3. FIGS. 5A, 5D, and 5F are schematic plan views of the first fabric item 10 on the work surface 112 of the folding table 110. FIGS. 5B, 5C, 5E, and 5G are schematic cross-sectional views along line BB depicted in FIG. 5A. In FIGS. 5B, 5C, 5E, and 5G, the thickness of the first fabric item 10 and the separations between the folded layers of the first fabric item 10 are exaggerated for clarity.

In FIG. 5A, the second fold plate 154 is positioned on the second platen 116 of the work surface 112 before the first fabric item 10 is placed onto the work surface 112. The second fold plate 154 is positioned such that the edge 155 is proximate and parallel to the demarcation line 115. In some embodiments, the robot 130 places the first fabric item 10 onto the work surface 112 and the second fold plate 154. The bonding side 16 of the first fabric item 10 is shown facing upwards. The first portion 32 of the first fabric item 10 is positioned on the first platen 114; the second and third portions 34, 36 of the first fabric item 10 are positioned on the second fold plate 154. In some embodiments, the first portion 32 of the first fabric item 10 is held on the first platen 114 by the application of a vacuum, as described above.

The first fold line 42 of the first fabric item 10 is proximate and parallel to the demarcation line 115. In some embodiments, the first fold line 42 includes an image projected onto the bonding side 16 of the first fabric item 10. In an example, a line of light representing the first fold line 42 is shone onto the bonding side 16 of the first fabric item 10.

FIG. 5A also depicts placement of the first fold plate 144 onto the first portion 32 of the first fabric item 10. The first fold plate 144 is positioned such that the edge 145 of the first fold plate 144 is proximate and parallel to the first fold line 42. As illustrated, the first fold line 42 is between the edge 145 of the first fold plate 144 and the edge 155 of the second fold plate 154. In some embodiments, the first portion 32 of the first fabric item 10 is held on the first platen 114 at least in part by the application of a force by the first fold plate 144 onto the first portion 32 of the first fabric item 10. FIG. 5B shows a schematic cross-sectional view corresponding to the schematic plan view depicted in FIG. 5A.

FIGS. 5C-5G schematically depict the making of the first fold at the first fold line 42. FIG. 5C depicts raising the second fold plate 154 off the second platen 116 while the first fold plate 144 remains in place on the first portion 32 of the first fabric item 10. The second fold plate 154 is maintained substantially parallel to the second platen 116. The second and third portions 34, 36 of the first fabric item 10 are lifted upwards by the second fold plate 154. The first portion 32 of the first fabric item 10 remains on the first platen 114. In some embodiments, the first portion 32 is held on the first platen 114 by a vacuum, as described above. In some embodiments, the first portion 32 is held on the first platen 114 at least in part by a force applied by the first fold plate 144.

FIGS. 5D and 5E depict the subsequent moving of the second fold plate 154 to place the second and third portions 34, 36 onto the first fold plate 144. The second fold plate 154 is moved over the first fold plate 144 in a direction substantially perpendicular to the second fold line 44. The second fold plate 154 is maintained substantially parallel to the while being moved over the first fold plate 144. The first portion 32 of the first fabric item 10 remains on the first platen 114 and below the first fold plate 144, as described above. While the second fold plate 154 is being moved, the second and third portions 34, 36 of the first fabric item 10 slide around the edge 155 of the second fold plate 154 to become placed onto the first fold plate 144.

Figure 5G:
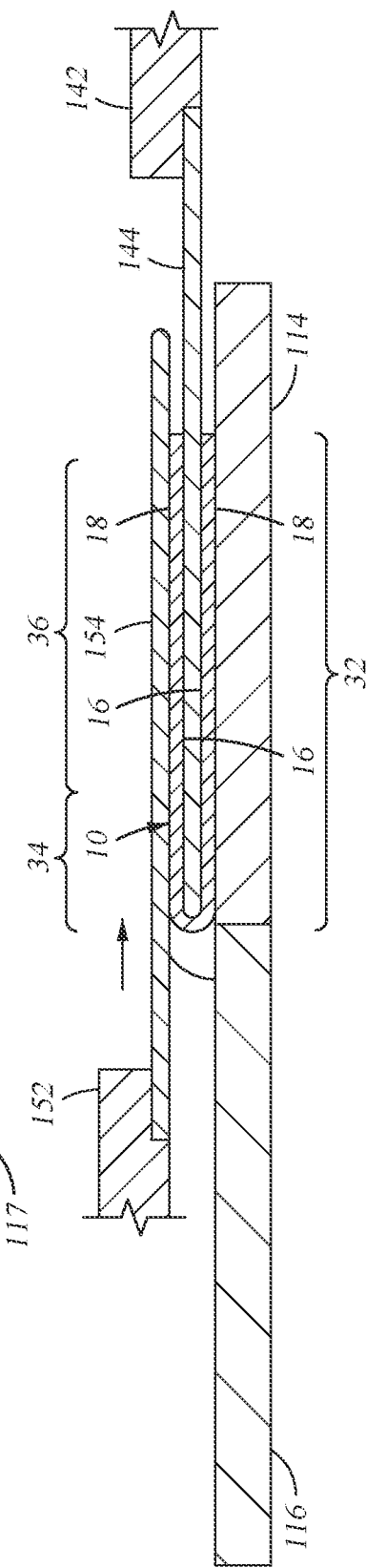

FIGS. 5F and 5G depict the result of the moving of the second fold plate 154 over the first fold plate 144. The second and third portions 34, 36 of the first fabric item 10 are between the first fold plate 144 and the second fold plate 154. The bonding side 16 of the second and third portions 34, 36 faces the first fold plate 144, and the reverse side 18 of the second and third portions 34, 36 faces upwards. The folding of the first fabric item 10, including making the second fold in the folding operation 202B of FIG. 3, continues as shown and described above with respect to FIGS. 4G-4S.

Figure 6A:
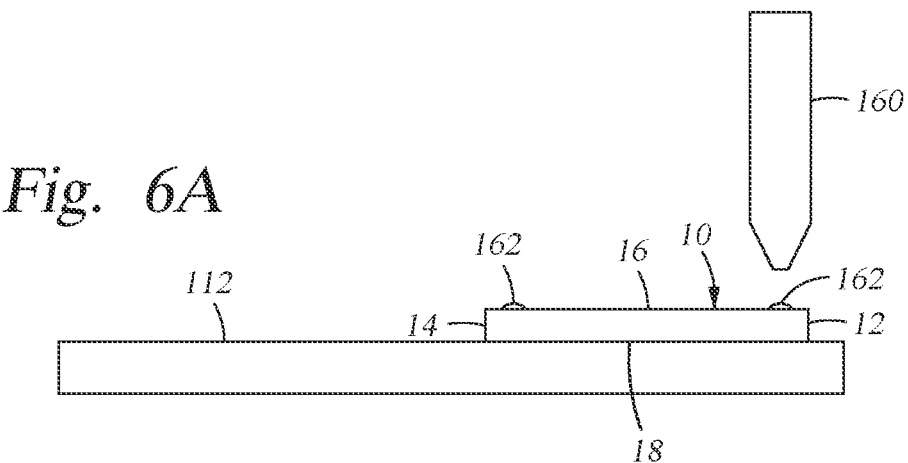
FIGS. 6A-6C schematically illustrate a process in which the fabric items of FIGS. 2A and 2B are joined.
Figure 6B:
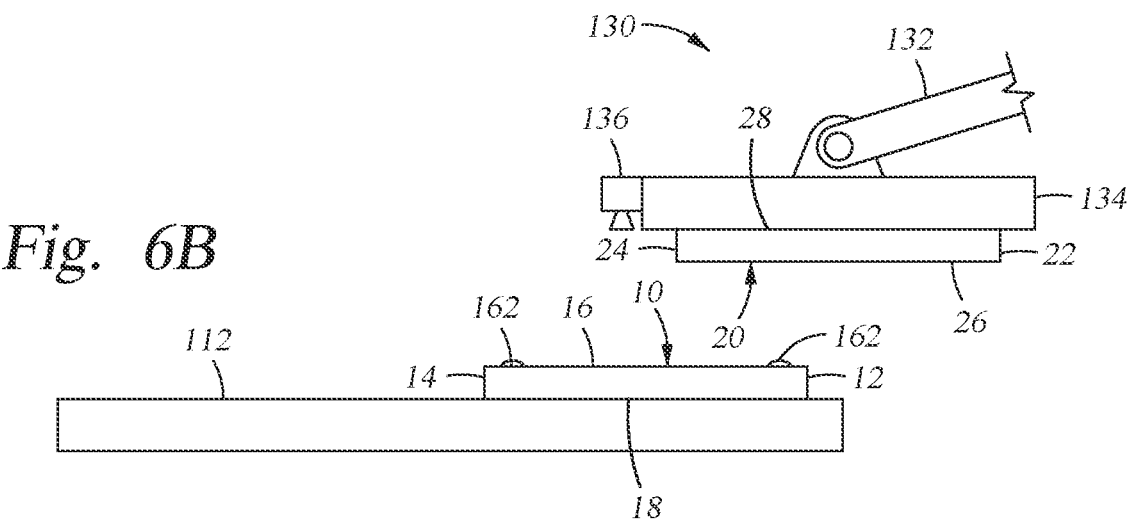
Figure 6C:
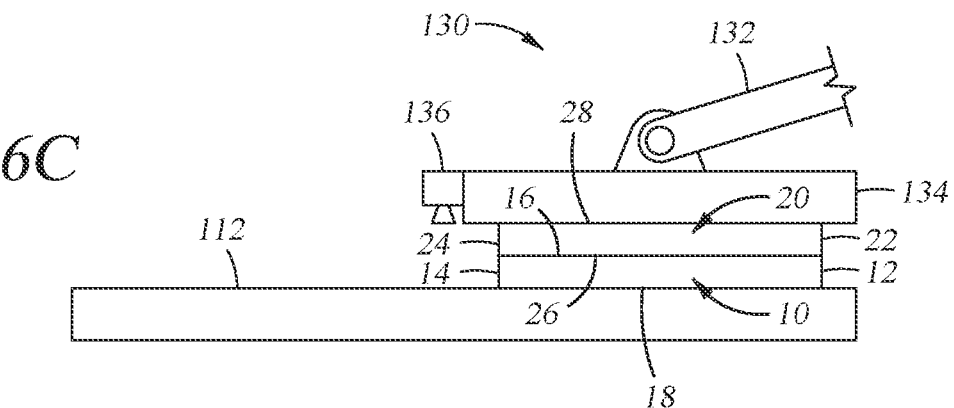

FIGS. 6A-6C are cross-sectional views that schematically illustrate the joining operation 204 in some embodiments. In FIG. 6A, the folded first fabric item 10 is on the work surface 112 with the bonding side 16 facing upwards. For clarity, the folds in the first fabric item 10 are not shown. In operation 204A of FIG. 3, an adhesive applicator 160, such as a nozzle, applies an adhesive 162 onto the bonding side 16 of the first fabric item 10 at the first edge 12 and at the second edge 14.

FIGS. 6B and 6C schematically illustrate an example process for operation 204B of FIG. 3. In FIG. 6B, the robot 130 is holding the second fabric item 20. The head 134 of the robot 130 is oriented such that the bonding side 26 of the second fabric item 20 faces downwards. In some embodiments, the sensor 136 of the robot 130 is used to determine the position, orientation, and/or extent of the first fabric item 10 on the work surface 112 before the robot 130 positions the second fabric item 20 onto the first fabric item 10. The robot 130 orients the head 134 such that the first edge 22 of the second fabric item 20 is aligned with the first edge 12 of the first fabric item 10, and the second edge 24 of the second fabric item 20 is aligned with the second edge 14 of the first fabric item 10.

In FIG. 6C, the robot 130 places the second fabric item 20 onto the first fabric item 10. The second fabric item 20 is positioned such that the first edge 22 of the second fabric item 20 is aligned with and overlays the first edge 12 of the first fabric item 10. Additionally, the second edge 24 of the second fabric item 20 is aligned with and overlays the second edge 14 of the first fabric item 10.

In some embodiments, the robot 130 may be operated such that the head 134 imparts a load onto the second fabric item 20 in order to press the second fabric item 20 against the first fabric item 10, and promote distribution of the adhesive 162 between and/or within the first fabric item 10 and the second fabric item 20.

In some embodiments, the head 134 of the robot 130 includes a heater. In such embodiments, the heater may be actuated while the head 134 presses the second fabric item 20 against the first fabric item 10 in order to cure the adhesive 162, and bond the second fabric item 20 to the first fabric item 10. In some embodiments, the heater may be omitted.

FIGS. 7A-7D are cross-sectional views that schematically illustrate an alternative process for the joining operation 204 in some embodiments. In FIG. 7A, the second fabric item 20 is held by the head 134 of the robot 130. The reverse side 28 faces the head 134, and the bonding side 26 faces away from the head 134. In operation 204A of FIG. 3, the adhesive applicator 160 applies the adhesive 162 onto the bonding side 26 of the second fabric item 20 while the second fabric item 20 is being held by the head 134 of the robot 130. FIG. 7B shows the head 134 of the robot 130 swiveling to orient the second fabric item 20 for placement onto the first fabric item 10.

FIGS. 7C and 7D schematically illustrate an example process for operation 204B of FIG. 3. In FIG. 7C, the folded first fabric item 10 is on the work surface 112 with the bonding side 16 facing upwards. For clarity, the folds in the first fabric item 10 are not shown. The head 134 of the robot 130 is oriented such that the bonding side 26 of the second fabric item 20 faces downwards. In some embodiments, the sensor 136 of the robot 130 is used to determine the position, orientation, and/or extent of the first fabric item 10 on the work surface 112 before the robot 130 positions the second fabric item 20 onto the first fabric item 10. The robot 130 orients the head 134 such that the first edge 22 of the second fabric item 20 is aligned with the first edge 12 of the first fabric item 10, and the second edge 24 of the second fabric item 20 is aligned with the second edge 14 of the first fabric item 10.

In FIG. 7D, the robot 130 places the second fabric item 20 onto the first fabric item 10. The second fabric item 20 is positioned such that the first edge 22 of the second fabric item 20 is aligned with and overlays the first edge 12 of the first fabric item 10. Additionally, the second edge 24 of the second fabric item 20 is aligned with and overlays the second edge 14 of the first fabric item 10.

In some embodiments, the robot 130 may be operated such that the head 134 imparts a load onto the second fabric item 20 in order to press the second fabric item 20 against the first fabric item 10, and promote distribution of the adhesive 162 between and/or within the first fabric item 10 and the second fabric item 20.

In some embodiments, the head 134 of the robot 130 includes a heater. In such embodiments, the heater may be actuated while the head 134 presses the second fabric item 20 against the first fabric item 10 in order to cure the adhesive 162, and bond the second fabric item 20 to the first fabric item 10. In some embodiments, the heater may be omitted.

Figure 8A:
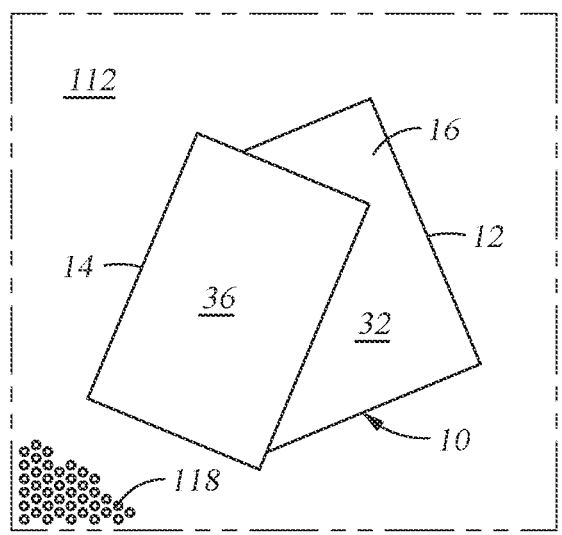
FIGS. 8A and 8B schematically illustrate a plan view of the fabric items of FIGS. 2A and 2B undergoing the joining processes of FIGS. 6A-6C and FIGS. 7A-7D.
Figure 8B:
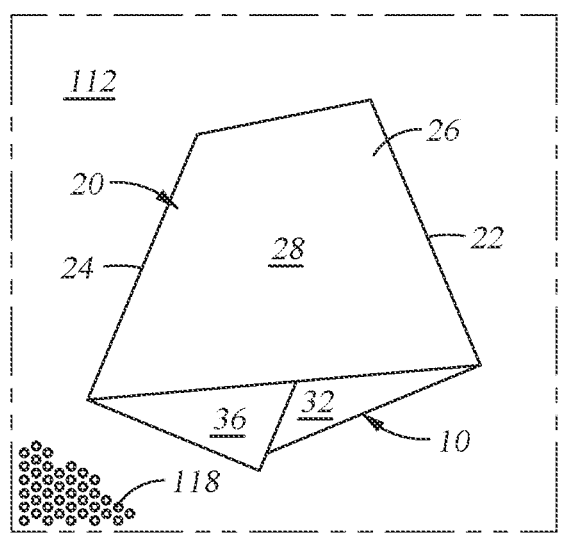

FIGS. 8A and 8B schematically illustrate a plan view of the first and second fabric items 10, 20 undergoing the joining processes of FIGS. 6A-6C and FIGS. 7A-7D. In FIG. 8A, the folded first fabric item 10 is atop the work surface 112. In some embodiments, the first fabric item 10 is held in place by the application of a vacuum through the perforations 118 of the work surface 112. The bonding side 16 of the first portion 32 and the third portion 36 faces upwards. The second portion 34 is sandwiched between the first and third portions 32, 36.

In FIG. 8B, the second fabric item 20 is positioned on the first fabric item 10. The reverse side 28 of the second fabric item 20 faces upwards; the bonding side 26 of the second fabric item 20 faces the bonding side 16 of the first fabric item 10. The first edge 22 of the second fabric item 20 is aligned with and overlays the first edge 12 of the first fabric item 10. Additionally, the second edge 24 of the second fabric item 20 is aligned with and overlays the second edge 14 of the first fabric item 10.

Figure 8C:
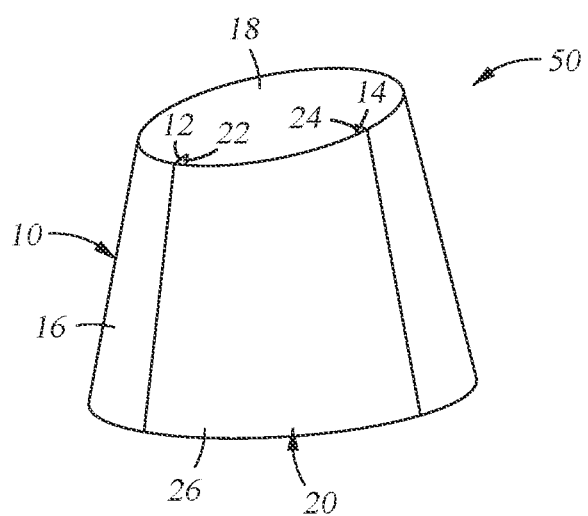
FIG. 8C schematically illustrates a resulting three-dimensional fabric structure.

FIG. 8C schematically illustrates a three-dimensional structure 50 resulting from the joining of the first and second fabric items 10, 20. The three-dimensional structure 50 has been turned inside-out such that the bonding sides 16, 26 of the first and second fabric items 10, 20, respectively, face outwards. The reverse sides 18, 28 of the first and second fabric items 10, 20, respectively, face inwards. Consequently, the first edges 12, 22 and the second edges 14, 24 of the first and second fabric items 10, 20, respectively, face inwards. In some embodiments, the three-dimensional structure 50 forms part of an eventual finished fabric article. In an example, the three-dimensional structure 50 forms at least a portion of a sleeve of a garment.

The systems and methods of the present disclosure enable automated folding of fabric items, and enable the joining of fabric items of dissimilar size and/or shape. The systems and methods of the present disclosure facilitate automation of fabric article manufacture. Such automation benefits manufacturing plant throughput and consistent quality control of finished products.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

It is contemplated that elements and features of any one disclosed embodiment may be beneficially incorporated in one or more other embodiments. While the foregoing is directed to embodiments of the present disclosure, other and further embodiments of the disclosure may be devised without departing from the basic scope thereof, and the scope thereof is determined by the claims that follow.

What is claimed is:

1. A method of folding a fabric item, comprising:
   placing the fabric item onto a work surface, wherein:
      the work surface comprises a first platen coupled to a second platen by a hinge;
      a first portion of the fabric item lays on the first platen;
      second and third portions of the fabric item lay on the second platen; and
      a first fold line delineates the first and second portions, and is proximate and parallel to a rotational axis of the hinge;
   positioning a first fold plate onto the first portion of the fabric item such that an edge of the first fold plate is proximate and parallel to the first fold line;
   folding the fabric item at the first fold line by pivoting the second platen about the hinge from a first position substantially coplanar with the first platen to a second position above the first platen;
   positioning a second fold plate onto the second portion of the fabric item, such that an edge of the second fold plate is proximate and parallel to a second fold line delineating the second and third portions;

folding the fabric item at the second fold line such that the third portion of the fabric item lays on the second fold plate; and removing the first and second fold plates while the fabric item remains folded.

2. The method of claim 1, wherein folding the fabric item at the first fold line further comprises:

holding the second and third portions of the fabric item on the second platen while pivoting the second platen from the first position to the second position;

then releasing the second and third portions of the fabric item from the second platen; and then pivoting the second platen from the second position to the first position.

3. The method of claim 2, wherein the holding of the second and third portions of the fabric item on the second platen comprises applying a vacuum.

4. The method of claim 1, further comprising:

after positioning the second fold plate onto the second portion of the fabric item, positioning the first fold plate below the third portion of the fabric item such that the edge of the first fold plate is proximate and parallel to the second fold line, whereby the second fold line is between the edge of the first fold plate and the edge of the second fold plate.

5. The method of claim 4, wherein positioning the first fold plate such that the edge of the first fold plate is proximate and parallel to the second fold line further comprises:

moving the first fold plate laterally from below the second portion of the fabric item while holding the first portion of the fabric item on the first platen by a vacuum.

6. The method of claim 4, wherein folding the first fabric item at the second fold line comprises:

raising the first fold plate, thereby raising the third portion of the fabric item; and then moving the first fold plate over the second the fold plate, thereby placing the third portion of the fabric item between the first and second fold plates.

7. The method of claim 6, wherein moving the first fold plate over the second the fold plate comprises moving the first fold plate laterally in a direction substantially perpendicular to the second fold line.

* * * * *